US011121365B2

(12) United States Patent
Inoue et al.

(10) Patent No.: US 11,121,365 B2
(45) Date of Patent: Sep. 14, 2021

(54) POSITIVE ELECTRODE ACTIVE MATERIAL AND METHOD FOR PRODUCING SAME, AND NON-AQUEOUS ELECTROLYTE SECONDARY BATTERY USING SAME

(71) Applicants: BASF TODA BATTERY MATERIALS LLC, Yamaguchi (JP); GS YUASA INTERNATIONAL LTD., Kyoto (JP)

(72) Inventors: Taisei Inoue, Sanyoonoda (JP); Daisuke Nishikawa, Sanyoonoda (JP); Manabu Yamamoto, Sanyoonoda (JP); Katsuya Inoue, Kyoto (JP)

(73) Assignees: BASF TODA BATTERY MATERIALS LLC, Yamaguchi (JP); GS YUASA INTERNATIONAL LTD., Kyoto (JP)

( * ) Notice: Subject to any disclaimer, the term of this patent is extended or adjusted under 35 U.S.C. 154(b) by 35 days.

(21) Appl. No.: 16/361,006

(22) Filed: Mar. 21, 2019

(65) Prior Publication Data

US 2019/0221839 A1    Jul. 18, 2019

Related U.S. Application Data

(63) Continuation of application No. PCT/JP2017/033040, filed on Sep. 13, 2017.

(30) Foreign Application Priority Data

| Sep. 21, 2016 | (JP) | JP2016-184479 |
| Dec. 15, 2016 | (JP) | JP2016-242982 |
| Sep. 8, 2017 | (JP) | 2017-173269 |
| Sep. 8, 2017 | (JP) | JP2017-173299 |

(51) Int. Cl.

| H01M 4/36 | (2006.01) |
| H01M 4/505 | (2010.01) |
| H01M 10/0525 | (2010.01) |
| H01M 4/525 | (2010.01) |
| C01G 53/00 | (2006.01) |
| H01M 4/02 | (2006.01) |

(52) U.S. Cl.
CPC .......... *H01M 4/366* (2013.01); *C01G 53/00* (2013.01); *C01G 53/44* (2013.01); *C01G 53/50* (2013.01); *C01G 53/56* (2013.01); *H01M 4/36* (2013.01); *H01M 4/505* (2013.01); *H01M 4/525* (2013.01); *H01M 10/0525* (2013.01); *C01P 2002/60* (2013.01); *C01P 2002/72* (2013.01); *C01P 2002/74* (2013.01); *C01P 2006/12* (2013.01); *C01P 2006/40* (2013.01); *H01M 2004/021* (2013.01); *H01M 2004/028* (2013.01)

(58) Field of Classification Search
CPC .... H01M 4/366; H01M 10/446; C01G 53/56; C01G 53/50; C01G 53/00; C01G 53/44
See application file for complete search history.

(56) References Cited

U.S. PATENT DOCUMENTS

| 2009/0220859 A1 | 9/2009 | Yoon et al. |
| 2011/0017528 A1 | 1/2011 | Kumar et al. |
| 2011/0052981 A1 | 3/2011 | Lopez et al. |
| 2014/0242468 A1 | 8/2014 | Song et al. |
| 2015/0318546 A1* | 11/2015 | Thackeray ............ H01M 4/485 429/158 |
| 2016/0164142 A1 | 6/2016 | Garsuch et al. |

FOREIGN PATENT DOCUMENTS

| EP | 2 096 692 A1 | 9/2009 |
| EP | 2 485 305 A1 | 8/2012 |
| EP | 2 693 535 A1 | 2/2014 |
| EP | 2 772 968 A1 | 9/2014 |
| EP | 2 833 445 A1 | 2/2015 |
| JP | 2008-56561 A | 3/2008 |
| JP | 2009-206100 A | 9/2009 |
| JP | 2012-43637 A | 3/2012 |
| JP | 2013-503450 A | 1/2013 |
| JP | 2013-73832 A | 4/2013 |
| JP | 2013-73833 A | 4/2013 |
| JP | 2014-7034 A | 1/2014 |
| JP | 2014-116162 A | 6/2014 |
| JP | 2014-170739 A | 9/2014 |
| JP | 2015-15230 A | 1/2015 |
| JP | 2015-153551 A | 8/2015 |
| JP | 2015-220220 A | 12/2015 |
| JP | 2016-167446 A | 9/2016 |
| JP | 2016-533624 A | 10/2016 |
| JP | 6315404 B2 | 4/2018 |
| WO | WO 2011/031544 A2 | 3/2011 |

OTHER PUBLICATIONS

Johnson, Christopher S. et al., "Synthesis, Characterization and Electrochemistry of Lithium Battery Electrodes: $xLi_2MnO_3 \cdot (1-x)LiMn_{0.333}Ni_{0.333}Co_{0.333}O_2$ ($0 \leq x \leq 0.7$)", Chemistry of Materials, vol. 20, No. 19, pp. 6095-6106, 2008.

(Continued)

*Primary Examiner* — Ladan Mohaddes
(74) *Attorney, Agent, or Firm* — DLA Piper LLP (US)

(57) ABSTRACT

When a non-aqueous electrolyte secondary battery in which a positive electrode active material comprising a layered lithium-composite oxide is used for a positive electrode is subjected to charge/discharge under a prescribed condition, in a graph showing the relationship between voltage "V" with discharge during $5^{th}$ cycle and value dQ/dV from differentiation of battery capacity "Q" with discharge during $5^{th}$ cycle by voltage "V", peak intensity ratio "r" represented by the equation: $r=|c|/(|a|+|b|+|c|)$ satisfies $0<r\leq 0.25$, in which $|a|$ is absolute value dQ/dV for a peak top within a range of more than 3.9V to 4.4V or less, $|b|$ is absolute value dQ/dV for a peak top within a range of more than 3.5V to 3.9V or less, and $|c|$ is absolute value dQ/dV for a peak top within a range of 2.0V or more to 3.5V or less.

6 Claims, 2 Drawing Sheets

(56) References Cited

OTHER PUBLICATIONS

Partial Supplementary European Search Report in European Application No. 17852916.0, dated Jun. 5, 2020.
International Search Report in International Application No. PCT/JP2017/033040, dated Oct. 31, 2017.
Kim, Donghan et al., "Composite 'Layered-Layered-Spinel' Cathode Structures for Lithium-Ion Batteries", Journal of the Electrochemical Society, vol. 160, Issue 1, pp. A31-A38, Nov. 2012.
Extended European Search Report in European Application No. 17852916.0, dated Oct. 8, 2020.

* cited by examiner

POSITIVE ELECTRODE ACTIVE MATERIAL AND METHOD FOR PRODUCING SAME, AND NON-AQUEOUS ELECTROLYTE SECONDARY BATTERY USING SAME

CROSS-REFERENCE TO RELATED APPLICATION

This application is a Continuation of International Application No. PCT/JP2017/033040, filed on Sep. 13, 2017, which claims the benefit of Japanese Patent Application No. 2016-184479, filed on Sep. 21, 2016, Japanese Patent Application No. 2016-242982, filed on Dec. 15, 2016, Japanese Patent Application No. 2017-173269, filed on Sep. 8, 2017, and Japanese Patent Application No. 2017-173299, filed on Sep. 8, 2017, all of the disclosures of which are hereby incorporated by reference herein in their entireties.

BACKGROUND

Field

The present invention relates to positive electrode active materials for non-aqueous electrolyte secondary batteries and methods for producing the same, and non-aqueous electrolyte secondary batteries using the same.

Description of the Related Art

In recent years, portable and cordless electronic devices such as audio-visual (AV) devices and personal computers have been rapidly developed. As a driving power source for these electronic devices, there is an increasing demand for secondary batteries having a small size, a light weight, and a high energy density. Also, in consideration of recent global environment, electric cars and hybrid cars have been developed and put into practice. As a result, there is an increasing demand for lithium ion secondary batteries having excellent storage property, which will be used for a power source having a large size. Under these circumstances, lithium ion secondary batteries having a large charge/discharge capacity have been noticed.

So far there have been known generally $LiMn_2O_4$ having a spinel structure, $LiMnO_2$ having a zigzag layered structure, $LiCoO_2$ and $LiNiO_2$ each having a layered rock salt structure, and the like as a positive electrode active material useful for high energy type lithium ion secondary batteries having a voltage of 4V class. Among them, a lithium ion secondary battery using $LiNiO_2$ has been noticed as a battery having a large charge/discharge capacity. However, this material is poor in heat stability and cycle property during charge, so more improvement in properties is demanded.

In accordance with demand for more increase of capacity, it has been found that a positive electrode active material containing $Li_2MnO_3$, having higher capacity, shows a large discharge capacity.

Other than these materials, there have been proposed a positive electrode active material comprising a composite oxide having a specified composition and a positive electrode active material comprising a lithium-metal oxide which is lithium-rich and manganese-rich (Japanese Laid-Open Patent Publications No. 2014-116162 and No. 2013-503450). The material comprising a composite oxide contains Li, Ni, Co and Mn, has an excessive lithium phase, and is focused on a discharge capacity when applied with a high load current as well as a charge/discharge efficiency. The material comprising a lithium-metal oxide is focused on the discharge capacity during repeated charge/discharge in addition to an average voltage and a specific capacity. However, these positive electrode active materials cannot fully satisfy an energy density demanded for recent lithium ion secondary batteries, and also cannot fully satisfy cycle property and rate property.

SUMMARY

There are currently most demanded:
a non-aqueous electrolyte secondary battery showing less voltage drop during repeated charge/discharge and having a high energy density, and a positive electrode active material used for the battery; and
a non-aqueous electrolyte secondary battery showing excellent cycle property and excellent rate property and also having a high energy density, and a positive electrode active material used for the battery. However, batteries and materials which fully satisfy necessary demands have not been proposed yet.

In particular, secondary batteries having a light weight and a large capacity are greatly desired for the electric cars and the like.

An object of the present invention is to obtain a positive electrode active material for a non-aqueous electrolyte secondary battery, which can provide the battery with less voltage drop during repeated charge/discharge and a high energy density, a method for producing the positive electrode active material, and a non-aqueous electrolyte secondary battery which has a positive electrode containing the positive electrode active material.

An object of the present invention is to obtain a positive electrode active material for a non-aqueous electrolyte secondary battery, which can provide the battery with excellent cycle property, excellent rate property and also a high energy density, a method for producing the positive electrode active material, and a non-aqueous electrolyte secondary battery which has a positive electrode containing the positive electrode active material.

(I) (Present Invention I-1)
The positive electrode active material (hereinafter also referred to as "positive electrode active material I") according to the present invention, comprises a layered lithium-composite oxide containing Li, Ni and Mn, and optionally containing Co, wherein
when a non-aqueous electrolyte secondary battery in which the positive electrode active material is used for a positive electrode and a lithium foil is used for a negative electrode is subjected to charge/discharge under a condition (I-1), in a graph of which horizontal axis is a voltage "V" and vertical axis is a value dQ/dV from differentiation of a battery capacity "Q" by the voltage "V" based on the voltage "V" and the battery capacity "Q" with discharge during $5^{th}$ cycle,
a peak intensity ratio "r" represented by the equation:

$$r=|Ic|/(|Ia|+|Ib|+|Ic|)$$

satisfies $0 < r \leq 0.25$, in which
|Ia| is an absolute value of the value dQ/dV for a peak top of a peak 1 having the peak top within a range of more than 3.9V to 4.4V or less,
|Ib| is an absolute value of the value dQ/dV for a peak top of a peak 2 having the peak top within a range of more than 3.5V to 3.9V or less, and
|Ic| is an absolute value of the value dQ/dV for a peak top of a peak 3 having the peak top within a range of 2.0V or more to 3.5V or less, the condition (I-1) is set as, under a circumstance at 25° C.:
$1^{st}$ cycle from 2.0V to 4.6V with charge at 0.07 C rate (cccv) and discharge at 0.07 C rate (cc),
$2^{nd}$ cycle from 2.0V to 4.6V with charge at 0.07 C rate (cc) and discharge at 0.07 C rate (cc),
$3^{rd}$ cycle from 2.0V to 4.3V with charge at 0.1 C rate (cc) and discharge at 0.1 C rate (cc),
$4^{th}$ cycle from 2.0V to 4.3V with charge at 0.1 C rate (cc) and discharge at 1 C rate (cc), and
$5^{th}$ cycle from 2.0V to 4.45V with charge at 0.1 C rate (cc) and discharge at 1 C rate (cc),
in which the C rate represents an hour rate and 1 C rate is converted into 270 mA/g.

(Present Invention I-2)

It is preferred that the positive electrode active material I according to the present invention I-1, is represented by the compositional formula (I):

$$(1-\alpha)(LiNi_xCo_yMn_zO_2) \cdot \alpha Li_2MnO_3 \quad (I)$$

in the compositional formula (I), when x, y and z are assumed as x+y+z=1, and when assumption is made that an average valence of Li is +1, an average valence of Co is +3, an average valence of Mn is +4 and an average valence of O is −2,
a range of α is 0.21≤α≤0.40, a range of x is 0.45≤x≤0.51, a range of y is 0≤y≤0.12, and an average valence of Ni is from +1.90 to +2.25.

(Present Invention I-3)

It is preferred that the positive electrode active material I according to the present invention I-1 or the present invention I-2, has a discharge energy density during $1^{st}$ cycle in the condition (I-1) of 880-1100 Wh/kg.

(Present Invention I-4)

The method for producing the positive electrode active material I according to the present invention, comprises:
a step of synthesizing a carbonate precursor compound containing Ni and Mn, and optionally containing Co under a condition of pH=6.8-13.2;
a step of preparing a mixture by mixing a lithium compound with the carbonate precursor compound so that a molar ratio of Li to a sum of Ni, Mn and Co, Li/(Ni+Co+Mn), is 1.25-1.39; and
a step of preparing the layered lithium-composite oxide by calcination of the mixture under an oxidizing atmosphere at 840-1000° C.

(Present Invention I-5)

It is preferred that in the method according to the present invention I-4,
a mixture solution is prepared by blending a nickel compound and a manganese compound so that a molar ratio of Ni and Mn, i.e., Ni:Mn is 0.25-0.45:0.55-0.75, or
a mixture solution is prepared by blending a nickel compound, a cobalt compound and a manganese compound so that a molar ratio of Ni, Co and Mn, i.e., Ni:Co:Mn is 0.25-0.45:0.02-0.10:0.50-0.70; and
the carbonate precursor compound is synthesized by using the mixture solution.

(Present Invention I-6)

It is preferred that in the method according to the present invention I-4 or the present invention I-5,
a surface of primary particles and/or secondary particles of the layered lithium-composite oxide is covered with an aluminum compound and/or a solid solution of the aluminum compound is prepared over the surface of the primary particles and/or the secondary particles of the layered lithium-composite oxide so that an amount of the aluminum compound is 0.1-0.7 wt % relative to the positive electrode active material.

(Present Invention I-7)

The non-aqueous electrolyte secondary battery (hereinafter also referred to as "non-aqueous electrolyte secondary battery I") according to the present invention, comprises a positive electrode containing the positive electrode active material I according to the present invention I-1, the present invention I-2 or the present invention I-3.

(II) (Present Invention II-1)

The positive electrode active material (hereinafter also referred to as "positive electrode active material II") according to the present invention, comprises a layered lithium-composite oxide containing Li, Ni and Mn, and optionally containing Co, wherein
a relative height intensity ratio of (IIa) to (IIb), (IIa)/(IIb), is 0.015-0.035, in which
(IIa) is a height intensity of a maximum diffraction peak at 2θ=20.8±1° and
(IIb) is a height intensity of a maximum diffraction peak at 2θ=18.6±1°,
in a powder X-ray diffraction pattern obtained by using Cu-Kα ray;
a crystallite size calculated by using Scherrer's equation from (104) diffracted X-ray is 25-40 nm, in the powder X-ray diffraction pattern obtained by using Cu-Kα ray; and
a BET specific surface area obtained by using a BET method is 3.5-8.5 m²/g.

(Present Invention II-2)

It is preferred that for the positive electrode active material II according to the present invention II-1,
when a non-aqueous electrolyte secondary battery in which the positive electrode active material is used for a positive electrode and a lithium foil is used for a negative electrode is subjected to charge/discharge under a condition (II-1),
a cycle property is 93% or more, the cycle property is obtained by using a discharge capacity during $4^{th}$ cycle and a discharge capacity during $29^{th}$ cycle, and is represented by the equation:

Cycle property (%)=(Discharge capacity during $29^{th}$ cycle/Discharge capacity during $4^{th}$ cycle)×100, and a rate property is 80% or more, the rate property is obtained by using the discharge capacity during $4^{th}$ cycle and a discharge capacity during $7^{th}$ cycle, and is represented by the equation:

Rate property (%)=(Discharge capacity during $7^{th}$ cycle/Discharge capacity during $4^{th}$ cycle)×100, the condition (II-1) is set as, under a circumstance at 25° C.:
$1^{st}$ cycle from 2.0V to 4.6V with charge at 0.07 C rate (cccv) and discharge at 0.07 C rate (cc),
$2^{nd}$ cycle from 2.0V to 4.6V with charge at 0.07 C rate (cc) and discharge at 0.07 C rate (cc),
$3^{rd}$ cycle from 2.0V to 4.3V with charge at 0.1 C rate (cc) and discharge at 0.07 C rate (cc),
$4^{th}$ cycle from 2.0V to 4.3V with charge at 0.1 C rate (cc) and discharge at 0.1 C rate (cc),
$5^{th}$ cycle from 2.0V to 4.3V with charge at 0.1 C rate (cc) and discharge at 0.2 C rate (cc),
$6^{th}$ cycle from 2.0V to 4.3V with charge at 0.1 C rate (cc) and discharge at 0.5 C rate (cc), 7th cycle from 2.0V to 4.3V with charge at 0.1 C rate (cc) and discharge at 1 C rate (cc), 8th cycle from 2.0V to 4.45V with charge at 0.1 C rate (cc) and discharge at 1 C (cc), and 9th-29th cycles each from 2.0V to 4.3V with charge at 0.2 C rate (cc) and discharge at 0.5 C rate (cc), in which the C rate represents an hour rate and 1 C rate is converted into 270 mA/g.

(Present Invention II-3)

It is preferred that the positive electrode active material II according to the present invention II-2, has a discharge energy density during $1^{st}$ cycle in the condition (II-1) of 880-1100 Wh/kg.

(Present Invention II-4)

It is preferred that the positive electrode active material II according to the present invention II-1, the present invention II-2 or the present invention II-3 is represented by the compositional formula (II):

$$\text{Li}_{1+\beta}(\text{Ni}_a\text{Co}_b\text{Mn}_c)_{1-\beta}\text{O}_2 \quad \text{(II)}$$

in the compositional formula (II), a range of β is $0.11 \le \beta \le 0.18$, a range of a is $0.20 \le \alpha \le 0.40$, a range of b is $0 \le b \le 0.08$, and a, b and c are fixed as a+b+c=1.

(Present Invention II-5)

The non-aqueous electrolyte secondary battery (hereinafter also referred to as "non-aqueous electrolyte secondary battery II") according to the present invention, comprises a positive electrode containing the positive electrode active material II according to the present invention II-1, the present invention II-2, the present invention II-3 or the present invention II-4.

According to the present invention, the positive electrode active material I can be obtained, which can provide a non-aqueous electrolyte secondary battery with a high energy density retention as well as less voltage drop during repeated charge/discharge and a high energy density.

According to the present invention, the positive electrode active material II can be obtained, which can provide a non-aqueous electrolyte secondary battery with excellent cycle property, excellent rate property and also a high energy density.

BRIEF DESCRIPTION OF THE DRAWINGS

This and other objects and features of the present invention will become clear from the following description, taken in conjunction with the exemplary embodiments with reference to the accompanied drawings in which.

DETAILED DESCRIPTION

Figure 1:
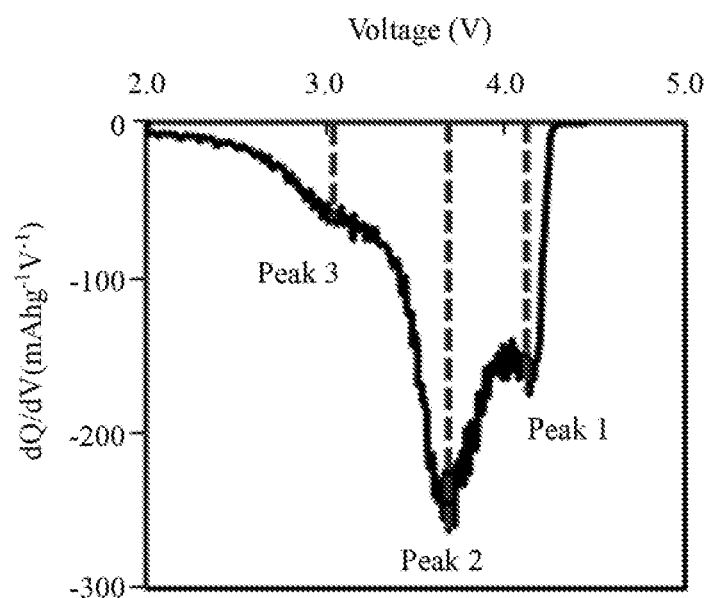
FIG. 1 shows a graph made in Example I-1, of which horizontal axis is a voltage V and vertical axis is a value dQ/dV.

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicant provides the attached drawings and the following description so that those skilled in the art can fully understand this disclosure. Therefore, the drawings and description are not intended to limit the subject defined by the claims.

Embodiments According to Present Invention I

<Positive Electrode Active Material I>

The positive electrode active material I according to the present invention will be described.

The positive electrode active material I according to the present invention comprises a lithium-rich layered lithium-composite oxide containing Li, Ni and Mn, and optionally containing Co.

The layered lithium-composite oxide in the present invention can be, for example, represented by the following compositional formula (I).

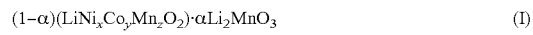

$$(1-\alpha)(\text{LiNi}_x\text{Co}_y\text{Mn}_z\text{O}_2)\cdot\alpha\text{Li}_2\text{MnO}_3 \quad \text{(I)}$$

In the compositional formula (I), when x, y and z are assumed as x+y+z=1, and when assumption is made that an average valence of Li is +1, an average valence of Co is +3, an average valence of Mn is +4 and an average valence of O is −2, it is preferred that a, x, y and an average valence of Ni are within the following respective ranges.

That is, the range of a is preferably $0.21 \le \alpha \le 0.40$, more preferably $0.25 \le \alpha \le 0.38$. The range of x is preferably $0.45 \le x \le 0.51$, more preferably $0.46 \le x \le 0.50$. The range of y is preferably $0 \le y \le 0.12$, more preferably $0 \le y \le 0.09$. The average valence of Ni is preferably from +1.90 to +2.25, more preferably from +1.98 to +2.16.

In the present invention, when α and x are less than the above-mentioned respective lower limits, the energy density lowers although voltage drop is less and the energy density retention heightens. When α is more than the above-mentioned upper limit and x is less than the above-mentioned lower limit, the voltage drop also increases although the energy density heightens. When y/x becomes to be too large, the voltage drop during charge/discharge increases and the energy density retention lowers.

When the non-aqueous electrolyte secondary battery I in which the positive electrode active material I is used for a positive electrode and a lithium foil is used for a negative electrode is subjected to charge/discharge under the following condition (I-1), in a graph of which horizontal axis is a voltage "V" and vertical axis is a value dQ/dV from differentiation of a battery capacity "Q" by the voltage "V" based on the voltage "V" and the battery capacity "Q" with discharge during $5^{th}$ cycle, a peak intensity ratio "r" represented by the following equation satisfies $0 < r \le 0.25$.

$$r = |Ic|/(|Ia|+|Ib|+|Ic|)$$

In the above-mentioned equation,

|Ia| is an absolute value of the value dQ/dV for a peak top of a peak 1 having the peak top within a range of more than 3.9V to 4.4V or less,

|Ib| is an absolute value of the value dQ/dV for a peak top of a peak 2 having the peak top within a range of more than 3.5V to 3.9V or less, and

|Ic| is an absolute value of the value dQ/dV for a peak top of a peak 3 having the peak top within a range of 2.0V or more to 3.5V or less.

The condition (I-1) is set as, under a circumstance at 25° C.:
 1$^{st}$ cycle from 2.0V to 4.6V with charge at 0.07 C rate (cccv) and discharge at 0.07 C rate (cc),
 2$^{nd}$ cycle from 2.0V to 4.6V with charge at 0.07 C rate (cc) and discharge at 0.07 C rate (cc),
 3$^{rd}$ cycle from 2.0V to 4.3V with charge at 0.1 C rate (cc) and discharge at 0.1 C rate (cc),
 4$^{th}$ cycle from 2.0V to 4.3V with charge at 0.1 C rate (cc) and discharge at 1 C rate (cc), and
 5$^{th}$ cycle from 2.0V to 4.45V with charge at 0.1 C rate (cc) and discharge at 1 C rate (cc).

The above-mentioned C rate represents an hour rate and 1 C rate is converted into 270 mA/g.

The peak intensity ratio r will be described by using drawings. FIG. 1 shows a graph made in Example I-1 mentioned later, of which horizontal axis is the voltage V and vertical axis is the value dQ/dV As shown in FIG. 1, it can be seen that the graph has the peak 1, the peak 2, and the peak 3. It has been found that when the absolute value |Ic| of the value dQ/dV for the peak top of the peak 3 is too small, the energy density lowers because r becomes to be small. It has been also found that when |Ic| is too large, the voltage drop increases because r becomes to be large, and the energy density retention lowers. In the present invention, the range of r is $0<r\leq0.25$, preferably $0.05\leq r\leq0.23$, and more preferably $0.07\leq r\leq0.21$.

It is considered that |Ic| is a parameter to which $Li_2MnO_3$ in the compositional formula (I) relates. Accordingly it is considered that the energy density lowers when |Ic| becomes to be small. It is also considered that |Ic| is a parameter which pertains to degree of occurring in the voltage drop during charge/discharge. There is tendency that although the energy density heightens when |Ic| becomes to be large, the voltage drop increases and the energy density retention lowers. Accordingly it can be considered that the positive electrode active material I can be obtained, which can provide a non-aqueous electrolyte secondary battery with less voltage drop, a high energy density and also a high energy density retention, when |Ic| is set within the suitable range.

As a result of earnest investigation, it has been found that a Co content in the positive electrode active material I according to the present invention is significantly lower than that in a NCM type material having a layered rock salt structure, such as $Li(Ni_{0.33}Co_{0.33}Mn_{0.33})O_2$. It is generally known that the energy density can be heightened by heightening the Co content and the energy density retention can be heightened by modifying a composition of the material. However, the followings are important view points in the present invention. That is, it has been found that the voltage drop can be suppressed and the energy density can be heightened by lowering the Co content without limit.

In the present invention, it is preferred that the discharge energy density during 1$^{st}$ cycle in the condition (I-1) is 880-1100 Wh/kg. When the discharge energy density is lower than the lower limit, there is no significance of the energy density in comparison with a ternary type material, i.e., $Li(Ni_{0.33}Co_{0.33}Mn_{0.33})O_2$, which has been already actually used. When the discharge energy density is higher than the upper limit, there is tendency that the energy density retention lowers. More preferable range of the discharge energy density is 900-1050 Wh/kg.

In the present invention, when the non-aqueous electrolyte secondary battery I in which the positive electrode active material I is used for a positive electrode and a lithium foil is used for a negative electrode is subjected to charge/discharge under a condition (I-2), the energy density retention is obtained by using a discharge energy density during 26$^{th}$ cycle and a discharge energy density during 7$^{th}$ cycle, and is represented by the following equation.

Energy density retention (%)=(Discharge energy density during 26$^{th}$ cycle/Discharge energy density during 7$^{th}$ cycle)×100

The energy density retention is preferably 93% or more, and more preferably 94% or more.

The condition (I-2) is set as, under a circumstance at 25° C.:
 1$^{st}$ cycle from 2.0V to 4.6V with charge at 0.07 C rate (cccv) and discharge at 0.07 C rate (cc),
 2$^{nd}$ cycle from 2.0V to 4.6V with charge at 0.07 C rate (cc) and discharge at 0.07 C rate (cc),
 3$^{rd}$ cycle from 2.0V to 4.6V with charge at 0.1 C rate (cc) and discharge at 0.1 C rate (cc),
 4$^{th}$ cycle from 2.0V to 4.6V with charge at 0.1 C rate (cc) and discharge at 0.2 C rate (cc),
 5$^{th}$ cycle from 2.0V to 4.6V with charge at 0.1 C rate (cc) and discharge at 0.5 C rate (cc),
 6$^{th}$ cycle from 2.0V to 4.6V with charge at 0.1 C rate (cc) and discharge at 1 C rate (cc), and
 7$^{th}$-26$^{th}$ cycles each from 2.0V to 4.6V with charge at 0.2 C rate (cc) and discharge at 0.5 C rate (cc).

The C rate represents an hour rate and 1 C rate is converted into 270 mA/g.

Figure 2:
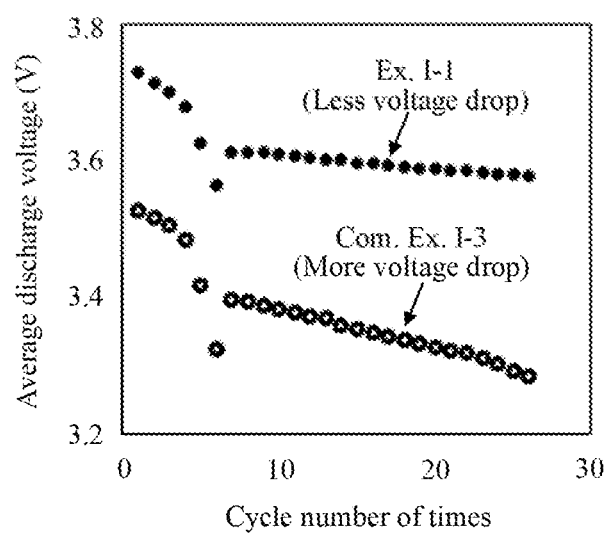
FIG. 2 shows a graph made by subjecting samples of Example I-1 and Comparative Example I-3 to charge/discharge under the condition (I-2), of which horizontal axis is a cycle number of times and vertical axis is an average discharge voltage.

It can be seen by measuring the discharge voltage during each cycle that a non-aqueous electrolyte secondary battery comprising a positive electrode containing the positive electrode active material I according to the present invention shows less voltage drop during the repeated charge/discharge under the condition (I-2). FIG. 2 shows a graph made by subjecting samples of Example I-1 and Comparative Example I-3 mentioned later to charge/discharge under the condition (I-2), of which horizontal axis is a cycle number of times and vertical axis is an average discharge voltage. As shown in FIG. 2, although the discharge voltage significantly drops with repeating the charge/discharge in Comparative Example I-3, the discharge voltage less drops even though the charge/discharge is repeated in Example I-1.

<Method for Producing Positive Electrode Active Material I>

The method for producing the positive electrode active material I, according to the present invention, will be described.

The positive electrode active material I according to the present invention can be produced by mixing previously synthesized particle powder of a carbonate precursor compound containing transition metals with a lithium compound to give a mixture, and subjecting the mixture to calcination.

The particle powder of the carbonate precursor compound containing transition metals (carbonate precursor compound containing Ni and Mn, and optionally containing Co) can be prepared in accordance with the following procedures. That is, to a reaction vessel are supplied a mixture solution containing a nickel compound and a manganese compound each having a prescribed concentration and optionally containing a cobalt compound having a prescribed concentration, and an alkaline aqueous solution, and then pH of a content of the reaction vessel is controlled to be within a suitable range. An overflowed suspension from the reaction vessel is pumped to an additional vessel which allows adjustment of the solid concentration and then recirculated to the reaction vessel, and reaction is continued till a particle concentration of the precursor compound in the reaction vessel and the concentration vessel becomes to be 0.1-15 mol/L. The particle powder of the precursor compound can be prepared from the overflowed suspension without procedures by using the concentration vessel. After those, washing with water and drying are carried out to give the carbonate precursor compound.

When the particle powder of the carbonate precursor compound containing Ni and Mn, and optionally containing Co is synthesized, it is preferred that the mixture solution is prepared by blending the nickel compound and the manganese compound each having a prescribed concentration and optionally blending the cobalt compound having a prescribed concentration so that the ratio of Ni, Mn and optional Co becomes to be within the desired range in consideration of composition of the aimed layered lithium-composite oxide.

When the particle powder of the carbonate precursor compound containing Ni and Mn is synthesized, it is preferred that the mixture solution is prepared by blending the nickel compound and the manganese compound so that the molar ratio of Ni and Mn, i.e., Ni:Mn is 0.25-0.45:0.55-0.75, more 0.30-0.40:0.60-0.70.

When the particle powder of the carbonate precursor compound containing Ni, Co and Mn is synthesized, it is preferred that the mixture solution is prepared by blending the nickel compound, the cobalt compound and the manganese compound so that the molar ratio of Ni, Co and Mn, i.e., Ni:Co:Mn is 0.25-0.45:0.02-0.10:0.50-0.70, more 0.30-0.40:0.03-0.08:0.55-0.65.

The above-mentioned suitable range of pH is 6.8-13.2, preferably 6.9-12.5, more preferably 7.0-12.0. When the pH is less than 6.8 during reaction of the mixture solution containing the nickel compound and the manganese compound each having a prescribed concentration and optionally containing the cobalt compound having a prescribed concentration, it becomes to be difficult that forming reaction of precipitate of, in particular, Ni occurs, and the carbonate precursor compound having the targeted composition cannot be prepared. As a result, the energy density and the energy density retention lower. When the pH is more than 13.2 during the reaction, a primary particle diameter of the carbonate precursor compound becomes to be large, and the energy density and the energy density retention lower. Also it is not preferred that the pH is more than 13.2 because a filling rate of the positive electrode active material I when producing an electrode lowers due to no preparation of spheric precursor compounds.

Then, the lithium compound and the carbonate precursor compound are mixed with each other so that the molar ratio of Li to a sum of Ni, Mn and optional Co, i.e., Li/(Ni+Co+Mn), is 1.25-1.39, preferably 1.25-1.38 to give the mixture, and the mixture is subjected to calcination under an oxidizing atmosphere at 840-1000° C. to give the layered lithium-composite oxide.

When a calcination temperature is lower than 840° C., the desired crystals cannot be formed. When the calcination temperature is higher than 1000° C., the energy density lowers due to excess progress of crystal growth. It is preferred that the calcination temperature is 850-970° C.

The lithium compound and the particle powder of the carbonate precursor compound containing transition metals can be mixed with each other by a dry mixing or a wet mixing as long as uniform mix can be carried out.

The precursor used in the present invention is composed of a carbonate. Accordingly, it is preferred to decompose the carbonate and to prevent the carbonate from remaining by satisfactory ventilation during calcination.

As the nickel compounds used for the present invention, for example, without specific limitations are cited nickel sulfate, nickel oxide, nickel hydroxide, nickel nitrate, nickel carbonate, nickel chloride, nickel iodide, metallic nickel, and the like. Preferable example is nickel sulfate.

As the cobalt compounds used for the present invention, for example, without specific limitations are cited cobalt sulfate, cobalt oxide, cobalt hydroxide, cobalt nitrate, cobalt carbonate, cobalt chloride, cobalt iodide, metallic cobalt, and the like. Preferable example is cobalt sulfate.

As the manganese compounds used for the present invention, for example, without specific limitations are cited manganese sulfate, manganese oxide, manganese hydroxide, manganese nitrate, manganese carbonate, manganese chloride, manganese iodide, metallic manganese, and the like. Preferable example is manganese sulfate.

As the lithium compounds, various lithium salts can be used for the present invention without specific limitations. For example, are cited lithium hydroxide monohydrate, lithium nitrate, lithium carbonate, lithium acetate, lithium bromide, lithium chloride, lithium citrate, lithium fluoride, lithium iodide, lithium lactate, lithium oxalate, lithium phosphate, lithium pyruvate, lithium sulfate, lithium oxide, and the like. Preferable example is lithium carbonate.

In order to more improve the energy density retention and a charge/discharge efficiency of a non-aqueous electrolyte secondary battery in which the positive electrode active material I is used for a positive electrode, a surface of primary particles and/or secondary particles of the layered lithium-composite oxide can be covered with an aluminum compound, and/or a solid solution of the aluminum compound can be prepared over the surface of the primary particles and/or the secondary particles of the layered lithium-composite oxide.

Covering with the aluminum compound can be carried out in accordance with the following procedures. That is, after the layered lithium-composite oxide is deflocculated in pure water and drops of the aluminum compound are put thereto with stirring, these are filtrated and washed with water, and dried at 80-120° C. or so. Then, calcination is carried out at 300-500° C. or so for approximately 5 hours in an electric furnace under air circulation.

The solid solution of the aluminum compound can be prepared by appropriately adjusting a drying temperature, a calcination temperature, and the like which are set when the covering with the aluminum compound is carried out.

As the aluminum compounds used for the present invention, for example, without specific limitations are cited aluminum sulfate, aluminum oxide, aluminum hydroxide, aluminum nitrate, aluminum carbonate, aluminum chloride, aluminum iodide, sodium aluminate, metallic aluminum, and the like. Preferable example is aluminum sulfate.

The surface of the layered lithium-composite oxide is covered with the aluminum compound so that the amount of the aluminum compound is preferably 0.1-0.7 wt %, more preferably 0.2-0.6 wt % relative to the positive electrode active material I. As a result, effects for more improving the energy density retention and effects for improving the charge/discharge efficiency can be more fully exhibited.

<Non-Aqueous Electrolyte Secondary Battery I>

Will be described the non-aqueous electrolyte secondary battery I comprising a positive electrode containing the positive electrode active material I according to the present invention.

The positive electrode containing the positive electrode active material I is produced in accordance with an ordinary method. That is, a conductive agent is added to a binder, and these are mixed with each other. As the conductive agent, for example, acetylene black, carbon black, graphite, and the like are preferred. As the binder, for example, polytetrafluoroethylene, polyvinylidene fluoride, and the like are preferred.

The non-aqueous electrolyte secondary battery I according to the present invention is produced by using the positive electrode containing the positive electrode active material I, and is constituted of the positive electrode, a negative electrode, and an electrolytic solution containing an electrolyte.

As a negative electrode active material, there can be used, for example, at least one nonmetallic element or metallic element selected from the group consisting of Si, Al, Sn, Pb, Zn, Bi and Cd, an alloy containing the element(s) or a chalcogenide containing the element(s), and metallic lithium, graphite, a low crystalline carbon material, and the like.

As a solvent of the electrolytic solution, there can be used an organic solvent including at least one of carbonates such as propylene carbonate and dimethyl carbonate, and ethers such as dimethoxyethane, as well as a combination of ethylene carbonate and diethyl carbonate.

As the electrolyte, there can be used by being dissolved to the above-mentioned solvent at least one of lithium salts such as lithium perchlorate and lithium tetrafluoroborate, as well as lithium hexafluorophosphate.

The non-aqueous electrolyte secondary battery I comprising a positive electrode containing the positive electrode active material I according to the present invention has the discharge energy density during $1^{st}$ cycle in the above-mentioned condition (I-1) of preferably 880-1100 Wh/kg, more preferably 900-1050 Wh/kg.

The non-aqueous electrolyte secondary battery I comprising a positive electrode containing the positive electrode active material I according to the present invention has the energy density retention based on the above-mentioned condition (I-2) of preferably 93% or more, more preferably 94% or more.

<Function>

In the present invention, by adjusting the peak intensity ratio r to the specified range, i.e., $0<r\leq0.25$, can be obtained the positive electrode active material I having the specified composition, which can provide a non-aqueous electrolyte secondary battery with less voltage drop during repeated charge/discharge, a high energy density, and also a high energy density retention. Additionally in the present invention, can be obtained the positive electrode active material I which can provide the battery with high battery characteristics in spite of the fact that the amount of Co which is a high-cost rare metal is reduced.

Embodiments According to Present Invention II

<Positive Electrode Active Material II>

The positive electrode active material II according to the present invention will be described.

The positive electrode active material II according to the present invention comprises a lithium-rich layered lithium-composite oxide containing Li, Ni and Mn, and optionally containing Co.

The positive electrode active material II according to the present invention can be represented, for example, by the following compositional formula (II).

In the compositional formula (II), it is preferred that: the range of β is $0.11\leq\beta\leq0.18$, more $0.12\leq\beta\leq0.17$; the range of a is $0.20\leq\alpha\leq0.40$, more $0.22\leq\alpha\leq0.38$; the range of b is $0\leq b\leq0.08$, more $0\leq b\leq0.07$; and a, b and c are fixed as a+b+c=1.

In the compositional formula (II), when β is less than the above-mentioned lower limit and a is more than the above-mentioned upper limit, the energy density lowers although the cycle property and the rate property become to be excellent. When β is more than the above-mentioned upper limit and a is less than the above-mentioned lower limit, the cycle property and the rate property become to be poor although the energy density can be heightened. When b is more than the above-mentioned upper limit, a crystallite becomes to be too large while highly crystalline because growth of the crystallite is accelerated during calcination of a mixture of a lithium compound and a carbonate precursor compound. As a result, the rate property lowers. Additionally when β is less than the above-mentioned lower limit, an impurity phase having a spinel structure, i.e., spinel hetero phase, generates, so the battery capacity is reduced. Generation of the spinel hetero phase can be seen by a X-ray diffraction (XRD). As disclosed in a literature "Composite 'Layered-Layered-Spinel' Cathode Structures for Lithium-Ion Batteries. M. M. Thackeray et al., J. Electrochem. Soc., 160 (2013) A31-A38", in case the spinel hetero phase generates, an apparent half-value width of (104) diffracted X-ray broadens, so a crystallite size may be calculated as a smaller value than the original value. Accordingly, considerable generation of the spinel hetero phase is out of the scope and spirits of the present invention, which affects a half-value width of (104) diffracted X-ray.

The positive electrode active material II according to the present invention has a relative height intensity ratio of (IIa) to (IIb), i.e., (IIa)/(IIb), of 0.015-0.035, preferably 0.017-0.034. The value (IIa) is a height intensity of a maximum diffraction peak at $2\theta=20.8\pm1°$ and the value (IIb) is a height intensity of a maximum diffraction peak at $2\theta=18.6\pm1°$ in a powder X-ray diffraction pattern obtained by using Cu-Kα ray. When the relative height intensity ratio is less than the lower limit, the energy density lowers although the cycle property and the rate property become to be excellent. As a result, the positive electrode active material II has no practical application. When the relative height intensity ratio is more than the upper limit, the cycle property and the rate property become to be poor although the energy density heightens. As a result, also the positive electrode active material II has no practical application.

The positive electrode active material II according to the present invention has a crystallite size calculated by using Scherrer's equation from (104) diffracted X-ray of 25-40 nm, preferably 26-39 nm in the powder X-ray diffraction pattern obtained by using Cu-Kα ray. In the present invention, the (104) diffracted X-ray when being indexed in a space group R-3m is used as the crystallite size. Because (003) diffracted X-ray includes information pertaining to only c-axis direction and (110) diffracted X-ray includes information pertaining to only ab-axis direction, these (003) diffracted X-ray and (110) diffracted X-ray are not preferred as a peak for calculation of the crystallite size. Other diffracted X-rays are also not preferred as the peak for calculation of the crystallite size because each peak intensity is low. When the crystallite size is less than the lower limit, a volume occupied by a surface of a crystallite relative to an inside of the crystallite becomes to be large. As a result, during the positive electrode active material II is used as a positive electrode active material for a non-aqueous electrolyte secondary battery, contribution of a surface of the material, of which structure most greatly varies, becomes to be significant, and reactivity of the material with an electrolytic solution becomes to be high. Accordingly, it is not preferred that the crystallite size is less than the lower limit. When the crystallite size is more than the upper limit, during the positive electrode active material II is used as a positive electrode active material for a non-aqueous electrolyte secondary battery, a diffusion length of Li within the crystallite becomes to be long, so the rate property becomes to be poor. Accordingly, it is not preferred that the crystallite size is more than the upper limit.

In the present invention, conditions for the X-ray diffraction are as follows.
Powder X-ray diffractometer: "SmartLab" commercially available from Rigaku Corporation
X-ray source: Cu-Kα ray
Accelerating voltage: 45 kV
Accelerating current: 200 mA
Sampling width: 0.01 deg
Scan range: 15-70 deg
Scan speed: 0.9 sec
Divergence slit width: 0.65 deg
Light receiving slit width: 0.2 mm
Scattering slit width: 0.65 deg The obtained X-ray diffraction data was analyzed by using an accompanying soft of the above-mentioned Powder X-ray diffractometer, i.e., "PDXL" commercially available from Rigaku Corporation, without removing peaks derived from Kα2 ray. After removing peaks among all peaks, which could not be indexed in the space group R-3m, optimization at an automatic mode was carried out, and the crystallite size corresponding to a peak represented by an index (104) in the space group R-3m was obtained.

The positive electrode active material II according to the present invention has a BET specific surface area of 3.5-8.5 m$^2$/g, preferably 3.7-8.3 m$^2$/g, more preferably 4.0-8.0 m$^2$/g. When the BET specific surface area is less than the lower limit, during the positive electrode active material II is used as a positive electrode active material for a non-aqueous electrolyte secondary battery, an area contacting with the electrolytic solution becomes to be small and the rate property becomes to be poor. Accordingly, it is not preferred that the BET specific surface area is less than the lower limit. When the BET specific surface area is more than the upper limit, during the positive electrode active material II is used as a positive electrode active material for a non-aqueous electrolyte secondary battery, the area contacting with the electrolytic solution becomes to be large and side reactions with the electrolytic solution become to be remarkable. Accordingly, it is not preferred that the BET specific surface area is more than the upper limit. The BET specific surface area can be measured, for example, in accordance with the following method. That is, after a sample is dried and deaerated at 120° C. for 45 minutes under nitrogen gas, the BET specific surface area is measured by using BET specific surface area measuring apparatus "MONOSORB" commercially available from Yuasa Ionics Corporation.

In the present invention, it is considered that heightening crystallinity of positive electrode active material particles and simultaneously minifying the crystallite size of the particles are preferred in order to provide a non-aqueous electrolyte secondary battery with excellent cycle property and excellent rate property when the particles are used as a positive electrode active material for the battery.

The crystallinity of the particles shows degree of low defects in a crystal lattice. It is considered that the crystallinity of the particles can be heightened and the cycle property of a non-aqueous electrolyte secondary battery can be improved when the particles are used as a positive electrode active material for the battery by carrying out calcination for synthesis of the lithium-composite oxide at a temperature as high as possible. However, when calcination is carried out at an overly high temperature in order to heighten the crystallinity of the particles, the following weaknesses occur. That is, the crystallite size becomes to be large, so the rate property becomes to be poor even if the cycle property is improved. Accordingly, it is necessary to set the calcination temperature within the suitable range.

A Co content in the positive electrode active material II according to the present invention is significantly lower than that in the ternary type material having a layered rock salt structure, such as Li(Ni$_{0.33}$Co$_{0.33}$Mn$_{0.33}$)O$_2$. As a result of earnest investigation, it has been found that the energy density can be heightened by heightening the Co content. However, the followings are important view points in the present invention. That is, it has been found that the positive electrode active material II can be produced, which can provide a non-aqueous electrolyte secondary battery with excellent cycle property, excellent rate property and also a high energy density, as well as can prevent the crystallite from excessively growing during calcination at a high temperature by lowering the content of Co without limit, which shows effects as a crystal growth flux.

When the non-aqueous electrolyte secondary battery II in which the positive electrode active material II is used for a positive electrode and a lithium foil is used for a negative electrode is subjected to charge/discharge under a condition (II-1), the cycle property is obtained by using a discharge capacity during 4$^{th}$ cycle and a discharge capacity during 29$^{th}$ cycle, and is represented by the following equation. Also the rate property is obtained by using the discharge capacity during 4$^{th}$ cycle and a discharge capacity during 7$^{th}$ cycle, and is represented by the following equation.

Cycle property (%)=(Discharge capacity during 29$^{th}$ cycle/Discharge capacity during 4$^{th}$ cycle)×100

The cycle property is preferably 93% or more, more preferably 94% or more.

Rate property (%)=(Discharge capacity during 7$^{th}$ cycle/Discharge capacity during 4$^{th}$ cycle)×100

The rate property is preferably 80% or more, more preferably 81% or more.
The condition (II-1) is set as, under a circumstance at 25° C.:
1$^{st}$ cycle from 2.0V to 4.6V with charge at 0.07 C rate (cccv) and discharge at 0.07 C rate (cc),
2$^{nd}$ cycle from 2.0V to 4.6V with charge at 0.07 C rate (cc) and discharge at 0.07 C rate (cc),
3$^{rd}$ cycle from 2.0V to 4.3V with charge at 0.1 C rate (cc) and discharge at 0.07 C rate (cc),
4$^{th}$ cycle from 2.0V to 4.3V with charge at 0.1 C rate (cc) and discharge at 0.1 C rate (cc),
5$^{th}$ cycle from 2.0V to 4.3V with charge at 0.1 C rate (cc) and discharge at 0.2 C rate (cc),
6$^{th}$ cycle from 2.0V to 4.3V with charge at 0.1 C rate (cc) and discharge at 0.5 C rate (cc),
7$^{th}$ cycle from 2.0V to 4.3V with charge at 0.1 C rate (cc) and discharge at 1 C rate (cc),
8$^{th}$ cycle from 2.0V to 4.45V with charge at 0.1 C rate (cc) and discharge at 1 C rate (cc), and
9$^{th}$-29$^{th}$ cycles each from 2.0V to 4.3V with charge at 0.2 C rate (cc) and discharge at 0.5 C rate (cc).
The C rate represents an hour rate and 1 C rate is converted into 270 mA/g.

In the present invention, it is preferred that the discharge energy density during 1$^{st}$ cycle in the condition (II-1) is 880-1100 Wh/kg. When the discharge energy density is lower than the lower limit, there is no significance of the energy density in comparison with the ternary type material, i.e., $Li(Ni_{0.33}Co_{0.33}Mn_{0.33})O_2$, which has been already actually used. When the discharge energy density is higher than the upper limit, there is tendency that the energy density retention lowers. More preferable range of the discharge energy density is 900-1050 Wh/kg.

Thus the cycle property and the rate property derived from the positive electrode active material II according to the present invention can be calculated by carrying out the charge/discharge under the condition (II-1) and measuring the discharge capacity during each cycle.

<Method for Producing Positive Electrode Active Material II>

The method for producing the positive electrode active material II according to the present invention will be described.

The positive electrode active material II according to the present invention can be produced by mixing previously synthesized particle powder of a carbonate precursor compound containing transition metals with a lithium compound to give a mixture, and subjecting the mixture to calcination.

The particle powder of the carbonate precursor compound containing transition metals (carbonate precursor compound containing Ni and Mn, and optionally containing Co) can be prepared in accordance with the following procedures. That is, to a reaction vessel are supplied a mixture solution containing a nickel compound and a manganese compound each having a prescribed concentration and optionally containing a cobalt compound having a prescribed concentration, and an alkaline aqueous solution, and then pH of a content of the vessel is controlled to be within a suitable range. An overflowed suspension from the reaction vessel is pumped to an additional vessel which allows adjustment of the solid concentration and then recirculated to the reaction vessel, and reaction is continued till a particle concentration of the precursor compound in the reaction vessel and the concentration vessel becomes to be 0.1-15 mol/L. The particle powder of the precursor compound can be prepared from the overflowed suspension without procedures by using the concentration vessel. After those, washing with water and drying are carried out to give the carbonate precursor compound.

When the particle powder of the carbonate precursor compound containing Ni and Mn, and optionally containing Co is synthesized, it is preferred that the mixture solution is prepared by blending the nickel compound and the manganese compound each having a prescribed concentration and optionally blending the cobalt compound having a prescribed concentration so that the ratio of Ni, Mn and optional Co becomes to be within the desired range in consideration of composition of the aimed layered lithium-composite oxide.

When the particle powder of the carbonate precursor compound containing Ni and Mn is synthesized, it is preferred that the mixture solution is prepared by blending the nickel compound and the manganese compound so that the molar ratio of Ni and Mn, i.e., Ni:Mn is 0.20-0.40:0.60-0.80, more 0.22-0.38:0.62-0.78.

When the particle powder of the carbonate precursor compound containing Ni, Co and Mn is synthesized, it is preferred that the mixture solution is prepared by blending the nickel compound, the cobalt compound and the manganese compound so that the molar ratio of Ni, Co and Mn, i.e., Ni:Co:Mn is 0.20-0.40:0.005-0.08:0.50-0.70, more 0.22-0.38:0.01-0.07:0.55-0.65.

The above-mentioned preferable range of pH is 7.0-13.0, more preferably 7.2-12.5, particular preferably 7.4-12.0. When the pH is less than 7.0 during reaction of the mixture solution containing the nickel compound and the manganese compound each having a prescribed concentration and optionally containing the cobalt compound having a prescribed concentration, it becomes to be difficult that forming reaction of precipitate of, in particular, Ni occurs, and the carbonate precursor compound having the targeted composition cannot be prepared. As a result, there is tendency that the energy density lowers. When the pH is more than 13.0 during the reaction, a primary particle diameter of the carbonate precursor compound becomes to be large. As a result, there is tendency that the energy density lowers. Also it is not preferred that the pH is more than 13.0 because a filling rate of the positive electrode active material II when producing an electrode lowers due to no preparation of spheric precursor compounds.

Then, the lithium compound and the carbonate precursor compound are mixed with each other so that the molar ratio of Li to a sum of Ni, Mn and optional Co, i.e., Li/(Ni+Co+Mn), is 1.25-1.41, preferably 1.25-1.40 to give the mixture, and the mixture is subjected to calcination under an oxidizing atmosphere at 840-1000° C. to give the layered lithium-composite oxide.

When a calcination temperature is lower than 840° C., the desired crystals cannot be formed. When the calcination temperature is higher than 1000° C., the energy density lowers due to excess progress of crystal growth. It is preferred that the calcination temperature is 850-970° C.

The lithium compound and the particle powder of the carbonate precursor compound containing transition metals can be mixed with each other by a dry mixing or a wet mixing as long as uniform mix can be carried out.

The precursor used in the present invention is composed of a carbonate. Accordingly, it is preferred to decompose the carbonate and to prevent the carbonate from remaining by satisfactory ventilation during calcination.

As the nickel compounds used for the present invention, for example, without specific limitations are cited nickel sulfate, nickel oxide, nickel hydroxide, nickel nitrate, nickel carbonate, nickel chloride, nickel iodide, metallic nickel, and the like. Preferable example is nickel sulfate.

As the cobalt compounds used for the present invention, for example, without specific limitations are cited cobalt sulfate, cobalt oxide, cobalt hydroxide, cobalt nitrate, cobalt carbonate, cobalt chloride, cobalt iodide, metallic cobalt, and the like. Preferable example is cobalt sulfate.

As the manganese compounds used for the present invention, for example, without specific limitations are cited manganese sulfate, manganese oxide, manganese hydroxide, manganese nitrate, manganese carbonate, manganese chloride, manganese iodide, metallic manganese, and the like. Preferable example is manganese sulfate.

As the lithium compounds, various lithium salts can be used for the present invention without specific limitations. For example, are cited lithium hydroxide monohydrate, lithium nitrate, lithium carbonate, lithium acetate, lithium bromide, lithium chloride, lithium citrate, lithium fluoride, lithium iodide, lithium lactate, lithium oxalate, lithium phosphate, lithium pyruvate, lithium sulfate, lithium oxide, and the like. Preferable example is lithium carbonate.

In order to more improve the energy density retention and a charge/discharge efficiency of a non-aqueous electrolyte secondary battery in which the positive electrode active material II is used for a positive electrode, a surface of primary particles and/or secondary particles of the layered lithium-composite oxide can be covered with an aluminum compound, and/or a solid solution of the aluminum compound can be prepared over the surface of the primary particles and/or the secondary particles of the layered lithium-composite oxide.

Covering with the aluminum compound can be carried out in accordance with the following procedures. That is, after the layered lithium-composite oxide is deflocculated in pure water and drops of the aluminum compound are put thereto with stirring, these are filtrated and washed with water, and dried at 80-120° C. or so. Then, calcination is carried out at 300-500° C. or so for approximately 5 hours in an electric furnace under air circulation.

The solid solution of the aluminum compound can be prepared by appropriately adjusting a drying temperature, a calcination temperature, and the like which are set when the covering with the aluminum compound is carried out.

As the aluminum compounds used for the present invention, for example, without specific limitations are cited aluminum sulfate, aluminum oxide, aluminum hydroxide, aluminum nitrate, aluminum carbonate, aluminum chloride, aluminum iodide, sodium aluminate, metallic aluminum, and the like. Preferable example is aluminum sulfate.

The surface of the layered lithium-composite oxide is covered with the aluminum compound so that the amount of the aluminum compound is preferably 0.1-0.7 wt %, more preferably 0.2-0.6 wt % relative to the positive electrode active material II. As a result, effects for more improving the energy density retention and effects for improving the charge/discharge efficiency can be more fully exhibited.

<Non-Aqueous Electrolyte Secondary Battery II>

Will be described the non-aqueous electrolyte secondary battery II comprising a positive electrode containing the positive electrode active material II according to the present invention.

The positive electrode containing the positive electrode active material II is produced in accordance with an ordinary method. That is, a conductive agent is added to a binder, and these are mixed with each other. As the conductive agent, for example, acetylene black, carbon black, graphite, and the like are preferred. As the binder, for example, polytetrafluoroethylene, polyvinylidene fluoride, and the like are preferred.

The non-aqueous electrolyte secondary battery II according to the present invention is produced by using the positive electrode containing the positive electrode active material II, and is constituted of the positive electrode, a negative electrode, and an electrolytic solution containing an electrolyte.

As a negative electrode active material, there can be used, for example, at least one nonmetallic element or metallic element selected from the group consisting of Si, Al, Sn, Pb, Zn, Bi and Cd, an alloy containing the element(s) or a chalcogenide containing the element(s), and metallic lithium, graphite, a low crystalline carbon material, and the like.

As a solvent of the electrolytic solution, there can be used an organic solvent including at least one of carbonates such as propylene carbonate and dimethyl carbonate, and ethers such as dimethoxyethane, as well as a combination of ethylene carbonate and diethyl carbonate.

As the electrolyte, there can be used by being dissolved to the above-mentioned solvent at least one of lithium salts such as lithium perchlorate and lithium tetrafluoroborate, as well as lithium hexafluorophosphate.

The non-aqueous electrolyte secondary battery II comprising a positive electrode containing the positive electrode active material II according to the present invention has the cycle property of preferably 93% or more, more preferably 94% or more and has the rate property of preferably 80% or more, more preferably 81% or more when the battery II is subjected to charge/discharge under the above-mentioned condition (II-1). The cycle property is obtained by using the discharge capacity during $4^{th}$ cycle and the discharge capacity during $29^{th}$ cycle, and is represented by the following equation. The rate property is obtained by using the discharge capacity during $4^{th}$ cycle and the discharge capacity during $7^{th}$ cycle, and is represented by the following equation.

Cycle property (%)=(Discharge capacity during $29^{th}$ cycle/Discharge capacity during $4^{th}$ cycle)×100

Rate property (%)=(Discharge capacity during $7^{th}$ cycle/Discharge capacity during $4^{th}$ cycle)×100

The non-aqueous electrolyte secondary battery II comprising a positive electrode containing the positive electrode active material II according to the present invention has the discharge energy density during $1^{st}$ cycle in the above-mentioned condition (II-1) of preferably 880-1100 Wh/kg, more preferably 900-1050 Wh/kg.

<Function>

In the present invention, to the specified range, i.e., 0.015-0.035 is adjusted the relative height intensity ratio of (IIa) to (IIb), i.e., (IIa)/(IIb), in which (IIa) is the height intensity of the maximum diffraction peak at $2\theta=20.8\pm1°$ and (IIb) is the height intensity of the maximum diffraction peak at $2\theta=18.6\pm1°$, in the powder X-ray diffraction pattern obtained by using Cu-Kα ray. Also the crystallite size calculated by using Scherrer's equation from (104) diffracted X-ray is adjusted to the specified range, i.e., 25-40 nm, in the powder X-ray diffraction pattern obtained by using Cu-Kα ray. Further the BET specific surface area is adjusted to the specified range, i.e., 3.5-8.5 $m^2/g$. Accordingly, can be obtained the positive electrode active material II which can provide a non-aqueous electrolyte secondary battery with excellent cycle property, excellent rate property, and also a high energy density. Additionally in the present invention, can be obtained the positive electrode active material II which can provide the battery with high battery characteristics in spite of the fact that the amount of Co which is a high-cost rare metal is reduced.

(Composition of Positive Electrode Active Material I or Positive Electrode Active Material II)

In this specification, the composition of the positive electrode active material I or the positive electrode active material II is determined in accordance with the following procedures. That is, a sample, i.e., 0.2 g of each positive electrode active material, is heated and dissolved in 25 mL of a hydrochloric acid solution having a concentration of 20% to give a sample solution. After the sample solution is cooled, the sample solution is transferred to a volumetric flask having a capacity of 100 mL, and then pure water is added thereto to give an adjusted solution. The quantity of each element in the positive electrode active material is determined by using the adjusted solution and ICP-OES Spectrometer "Optima8300" commercially available from PerkinElmer Japan Co., Ltd.

(Assembling of Coin Cell by Using Positive Electrode Active Material I or Positive Electrode Active Material II)

In this specification, a coin cell is assembled by using the positive electrode active material I or the positive electrode active material II in accordance with the following procedures. That is, are mixed 84% by weight of each positive electrode active material, 4% by weight of acetylene black and 4% by weight of graphite "KS-6" as the conductive agent, and 8% by weight of polyvinylidene fluoride as the binder, which has been dissolved in N-methylpyrrolidone, to give a mixture. Then, Al metallic foil is coated with the mixture and dried at 110° C. to give a sheet. A sample sheet having a diameter of 15 mm is stamped out from this sheet and crimped under 3 t/cm$^2$ to give a positive electrode. In the present invention, a coating amount of the positive electrode was 10 mg/cm$^2$, and a density of the positive electrode after rolling was 2.5 g/cm$^3$. A sheet having a diameter of 16 mm is stamped out from metallic lithium foil to give a negative electrode having a thickness of 500 m. In a solvent prepared by mixing EC with DMC in a volume ratio of EC:DMC=1:2 is dissolved 1 mol/L of LiPF$_6$ to give an electrolytic solution. A coin cell having 2032 size is assembled by using these positive electrode, negative electrode, and electrolytic solution.

(Evaluation of Positive Electrode Active Material II by Powder X-Ray Diffraction)

The powder X-ray diffraction for powder of the positive electrode active material II was carried out under the above-mentioned conditions by using the above-mentioned powder X-ray diffractometer "SmartLab" commercially available from Rigaku Corporation. From the obtained powder X-ray diffraction pattern was calculated the relative height intensity ratio of (IIa) being the height intensity of a maximum diffraction peak at 2θ=20.8±10 to (IIb) being the height intensity of a maximum diffraction peak at 2θ=18.6±10, i.e., (IIa)/(IIb). The obtained data was analyzed by using the accompanying soft of the powder X-ray diffractometer, i.e., "PDXL", and the crystallite size was calculated by using Scherrer's equation from (104) diffracted X-ray.

The present invention will be concretely described by using specific examples of the present invention and comparative examples. However, the present invention is not limited to these examples.

Examples According to Present Invention I and Comparative Examples

Example I-1

Were prepared 0.1 mol/L of a nickel sulfate aqueous solution and 0.1 mol/L of a manganese sulfate aqueous solution. The nickel sulfate aqueous solution and the manganese sulfate aqueous solution were mixed with each other so that a molar ratio of nickel and manganese was adjusted to Ni:Mn=0.35:0.65 to give a mixture solution. Was prepared 1 mol/L of a sodium carbonate aqueous solution. To a sealed type reaction vessel was supplied 8 L of water, and a temperature inside the reaction vessel was kept at 40° C. under nitrogen gas circulation. Drops of the mixture solution and the sodium carbonate aqueous solution were continuously put to the reaction vessel with stirring at a speed of 5 mL/min. Simultaneously drops of the sodium carbonate aqueous solution were put to the reaction vessel so that a reacting solution in the reaction vessel had pH of 8.00 (±0.01). During reaction of the reacting solution, only a filtrate was removed from a reaction system by using a concentration vessel and a solid content was stirred at 500 rpm for 20 hours with retaining in the reaction vessel. After reaction, a slurry of a coprecipitated product was collected. The collected slurry was filtrated and washed with water. After washing with water, the slurry was dried overnight at 120° C. to give powder of a coprecipitated precursor.

The coprecipitated precursor was subjected to ICP emission spectrometry. As a result, it was found that the coprecipitated precursor was a carbonate precursor compound represented by the formula: $(Ni_{0.35}Mn_{0.65})CO_3$. Lithium carbonate powder was weighed so that a molar ratio of lithium to the coprecipitated precursor was adjusted to Li/(Ni+Mn)=1.30, and the lithium carbonate powder was fully mixed with the coprecipitated precursor to give a mixture. The mixture was subjected to calcination under an oxidizing atmosphere at 900° C. for 5 hours in an electric furnace to give a positive electrode active material.

A coin cell was assembled in accordance with the above-mentioned method by using the obtained positive electrode active material as a positive electrode and a lithium foil as a negative electrode. The coin cell was subjected to the charge/discharge under the above-mentioned condition (I-1). Based on a voltage V and a battery capacity Q with discharge during 5$^{th}$ cycle, was plotted a graph of which horizontal axis is the voltage V and vertical axis is the value dQ/dV The graph is shown in FIG. 1.

From the graph shown in FIG. 1, the values |Ia|, |Ib| and |Ic| were determined and the peak intensity ratio r was calculated by using these values. The obtained values are as follows.

|Ia|=171 mAhg$^{-1}$V$^{-1}$

|Ib|=257 mAhg$^{-1}$V$^{-1}$

|Ic|=64 mAhg$^{-1}$V$^{-1}$ r=0.13

Were determined the energy density with discharge during 1$^{st}$ cycle in the above-mentioned condition (I-1) and the energy density retention based on the above-mentioned condition (I-2). The obtained values are as follows.

Energy density=944 Wh/kg

Energy density retention=96.3%

The coin cell was subjected to the charge/discharge under the above-mentioned condition (I-2), and a discharge voltage during each cycle was measured. The relationship between the cycle number of times and the average discharge voltage was plotted as a graph. The graph is shown in FIG. 2.

Example I-2

Powder of a coprecipitated precursor was synthesized in the same manner as in Example I-1 except for the following procedures. That is, the nickel sulfate aqueous solution, a cobalt sulfate aqueous solution and the manganese sulfate aqueous solution were mixed with each other so that a molar ratio of nickel, cobalt and manganese was adjusted to Ni:Co:Mn=0.35:0.05:0.60 to give a mixture solution.

It was found that the coprecipitated precursor was a carbonate precursor compound represented by the formula: $(Ni_{0.35}Co_{0.05}Mn_{0.60})CO_3$. Lithium carbonate powder was weighed so that a molar ratio of lithium to the coprecipitated precursor was adjusted to Li/(Ni+Co+Mn)=1.25, and the lithium carbonate powder was fully mixed with the coprecipitated precursor to give a mixture. The mixture was subjected to calcination under the oxidizing atmosphere at 850° C. for 5 hours in the electric furnace to give a positive electrode active material.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Example I-3

Powder of a coprecipitated precursor was synthesized in the same manner as in Example I-1 except for the following procedures. That is, the nickel sulfate aqueous solution, the cobalt sulfate aqueous solution and the manganese sulfate aqueous solution were mixed with each other so that a molar ratio of nickel, cobalt and manganese was adjusted to Ni:Co:Mn=0.310:0.055:0.635 to give a mixture solution.

It was found that the coprecipitated precursor was a carbonate precursor compound represented by the formula: $(Ni_{0.310}Co_{0.055}Mn_{0.635})CO_3$. Lithium carbonate powder was weighed so that a molar ratio of lithium to the coprecipitated precursor was adjusted to Li/(Ni+Co+Mn)=1.375, and the lithium carbonate powder was fully mixed with the coprecipitated precursor to give a mixture. The mixture was subjected to calcination under the oxidizing atmosphere at 880° C. for 5 hours in the electric furnace to give a positive electrode active material.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Example I-4

Powder of a coprecipitated precursor was synthesized in the same manner as in Example I-1. It was found that the coprecipitated precursor was a carbonate precursor compound represented by the formula: $(Ni_{0.35}Mn_{0.65})CO_3$. Lithium carbonate powder was weighed so that a molar ratio of lithium to the coprecipitated precursor was adjusted to Li/(Ni+Mn)=1.30, and the lithium carbonate powder was fully mixed with the coprecipitated precursor to give a mixture. The mixture was subjected to calcination under the oxidizing atmosphere at 900° C. for 5 hours in the electric furnace to give particle powder of a lithium-composite oxide.

Then 100 g of the particle powder of the lithium-composite oxide was supplied to 50 mL of pure water with stirring, of which temperature was kept at 30° C., to give a slurry of an intermediate calcined material. To the slurry of the intermediate calcined material were put drops of 6 mL of an aluminum sulfate aqueous solution having an aluminum sulfate concentration of 1.0 mol/L. A reaction system of the slurry and the aluminum sulfate aqueous solution was filtrated and washed with water, and then dried at 120° C. The reaction system was subjected to calcination under air circulation at 400° C. for 5 hours in the electric furnace to give a positive electrode active material. A surface treated amount of the positive electrode active material with the aluminum sulfate was 0.31 wt %.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Example I-5

Powder of a coprecipitated precursor was synthesized in the same manner as in Example I-1 except for the following procedures. That is, drops of the sodium carbonate aqueous solution were put to the reaction vessel so that a reacting solution in the reaction vessel had pH of 8.50 (±0.01).

It was found that the coprecipitated precursor was a carbonate precursor compound represented by the formula: $(Ni_{0.35}Mn_{0.65})CO_3$. Lithium carbonate powder was weighed so that a molar ratio of lithium to the coprecipitated precursor was adjusted to Li/(Ni+Mn)=1.30, and the lithium carbonate powder was fully mixed with the coprecipitated precursor to give a mixture. The mixture was subjected to calcination under the oxidizing atmosphere at 900° C. for 5 hours in the electric furnace to give a positive electrode active material.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Example I-6

Powder of a coprecipitated precursor was synthesized in the same manner as in Example I-2 except for the following procedures. That is, drops of the sodium carbonate aqueous solution were put to the reaction vessel so that a reacting solution in the reaction vessel had pH of 7.50 (±0.01).

It was found that the coprecipitated precursor was a carbonate precursor compound represented by the formula: $(Ni_{0.35}Co_{0.05}Mn_{0.60})CO_3$. Lithium carbonate powder was weighed so that a molar ratio of lithium to the coprecipitated precursor was adjusted to Li/(Ni+Co+Mn)=1.25, and the lithium carbonate powder was fully mixed with the coprecipitated precursor to give a mixture. The mixture was subjected to calcination under the oxidizing atmosphere at 850° C. for 5 hours in the electric furnace to give a positive electrode active material.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Example I-7

Powder of a coprecipitated precursor was synthesized in the same manner as in Example I-3 except for the following procedures. That is, drops of the sodium carbonate aqueous solution were put to the reaction vessel so that a reacting solution in the reaction vessel had pH of 9.00 (±0.01).

It was found that the coprecipitated precursor was a carbonate precursor compound represented by the formula: $(Ni_{0.310}Co_{0.055}Mn_{0.635})CO_3$. Lithium carbonate powder was weighed so that a molar ratio of lithium to the coprecipitated precursor was adjusted to Li/(Ni+Co+Mn)=1.375, and the lithium carbonate powder was fully mixed with the coprecipitated precursor to give a mixture. The mixture was subjected to calcination under the oxidizing atmosphere at 880° C. for 5 hours in the electric furnace to give a positive electrode active material.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Example I-8

Powder of a coprecipitated precursor was synthesized in the same manner as in Example I-1 except for the following procedures. That is, drops of the sodium carbonate aqueous solution were put to the reaction vessel so that a reacting solution in the reaction vessel had pH of 9.50 (±0.01). It was found that the coprecipitated precursor was a carbonate precursor compound represented by the formula: $(Ni_{0.35}Mn_{0.65})CO_3$. Lithium carbonate powder was weighed so that a molar ratio of lithium to the coprecipitated precursor was adjusted to Li/(Ni+Mn)=1.30, and the lithium carbonate powder was fully mixed with the coprecipitated precursor to give a mixture. The mixture was subjected to calcination under the oxidizing atmosphere at 900° C. for 5 hours in the electric furnace to give particle powder of a lithium-composite oxide.

Then a positive electrode active material was produced by using the particle powder of the lithium-composite oxide and the aluminum sulfate aqueous solution in the same manner as in Example I-4. The surface treated amount of the positive electrode active material with the aluminum sulfate was 0.31 wt %.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Comparative Example I-1

Powder of a coprecipitated precursor was synthesized in the same manner as in Example I-1 except for the following procedures. That is, the nickel sulfate aqueous solution, the cobalt sulfate aqueous solution and the manganese sulfate aqueous solution were mixed with each other so that a molar ratio of nickel, cobalt and manganese was adjusted to Ni:Co:Mn=0.35:0.10:0.55 to give a mixture solution.

It was found that the coprecipitated precursor was a carbonate precursor compound represented by the formula: $(Ni_{0.35}Co_{0.10}Mn_{0.55})CO_3$. Lithium carbonate powder was weighed so that a molar ratio of lithium to the coprecipitated precursor was adjusted to Li/(Ni+Co+Mn)=1.20, and the lithium carbonate powder was fully mixed with the coprecipitated precursor to give a mixture. The mixture was subjected to calcination under the oxidizing atmosphere at 880° C. for 5 hours in the electric furnace to give a positive electrode active material.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Comparative Example I-2

Powder of a coprecipitated precursor was synthesized in the same manner as in Example I-1 except for the following procedures. That is, the nickel sulfate aqueous solution, the cobalt sulfate aqueous solution and the manganese sulfate aqueous solution were mixed with each other so that a molar ratio of nickel, cobalt and manganese was adjusted to Ni:Co:Mn=0.42:0.05:0.53 to give a mixture solution.

It was found that the coprecipitated precursor was a carbonate precursor compound represented by the formula: $(Ni_{0.42}Co_{0.05}Mn_{0.53})CO_3$. Lithium carbonate powder was weighed so that a molar ratio of lithium to the coprecipitated precursor was adjusted to Li/(Ni+Co+Mn)=1.20, and the lithium carbonate powder was fully mixed with the coprecipitated precursor to give a mixture. The mixture was subjected to calcination under the oxidizing atmosphere at 910° C. for 5 hours in the electric furnace to give a positive electrode active material.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Comparative Example I-3

Powder of a coprecipitated precursor was synthesized in the same manner as in Example I-1 except for the following procedures. That is, the nickel sulfate aqueous solution, the cobalt sulfate aqueous solution and the manganese sulfate aqueous solution were mixed with each other so that a molar ratio of nickel, cobalt and manganese was adjusted to Ni:Co:Mn=0.20:0.13:0.67 to give a mixture solution.

It was found that the coprecipitated precursor was a carbonate precursor compound represented by the formula: $(Ni_{0.20}Co_{0.13}Mn_{0.67})CO_3$. Lithium carbonate powder was weighed so that a molar ratio of lithium to the coprecipitated precursor was adjusted to Li/(Ni+Co+Mn)=1.40, and the lithium carbonate powder was fully mixed with the coprecipitated precursor to give a mixture. The mixture was subjected to calcination under the oxidizing atmosphere at 880° C. for 5 hours in the electric furnace to give a positive electrode active material.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

The coin cell was subjected to the charge/discharge under the above-mentioned condition (I-2), and a discharge voltage during each cycle was measured. The relationship between the cycle number of times and the average discharge voltage was plotted as a graph. The graph is shown in FIG. 2.

Comparative Example I-4

Powder of a coprecipitated precursor was synthesized in the same manner as in Example I-1 except for the following procedures. That is, the nickel sulfate aqueous solution, the cobalt sulfate aqueous solution and the manganese sulfate aqueous solution were mixed with each other so that a molar ratio of nickel, cobalt and manganese was adjusted to Ni:Co:Mn=0.25:0.10:0.65 to give a mixture solution.

It was found that the coprecipitated precursor was a carbonate precursor compound represented by the formula: $(Ni_{0.25} Co_{0.10} Mn_{0.65})CO_3$. Lithium carbonate powder was weighed so that a molar ratio of lithium to the coprecipitated precursor was adjusted to Li/(Ni+Co+Mn)=1.35, and the lithium carbonate powder was fully mixed with the coprecipitated precursor to give a mixture. The mixture was subjected to calcination under the oxidizing atmosphere at 830° C. for 5 hours in the electric furnace to give a positive electrode active material.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Comparative Example I-5

Powder of a coprecipitated precursor was synthesized in the same manner as in Comparative Example I-1 except for the following procedures. That is, drops of the sodium carbonate aqueous solution were put to the reaction vessel so that a reacting solution in the reaction vessel had pH of 7.50 (±0.01).

It was found that the coprecipitated precursor was a carbonate precursor compound represented by the formula: $(Ni_{0.35} Co_{0.10} Mn_{0.55})CO_3$. Lithium carbonate powder was weighed so that a molar ratio of lithium to the coprecipitated precursor was adjusted to Li/(Ni+Co+Mn)=1.20, and the lithium carbonate powder was fully mixed with the coprecipitated precursor to give a mixture. The mixture was subjected to calcination under the oxidizing atmosphere at 880° C. for 5 hours in the electric furnace to give a positive electrode active material.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Comparative Example I-6

Powder of a coprecipitated precursor was synthesized in the same manner as in Comparative Example I-2 except for the following procedures. That is, drops of the sodium carbonate aqueous solution were put to the reaction vessel so that a reacting solution in the reaction vessel had pH of 9.00 (±0.01).

It was found that the coprecipitated precursor was a carbonate precursor compound represented by the formula: $(Ni_{0.42} Co_{0.05} Mn_{0.53})CO_3$. Lithium carbonate powder was weighed so that a molar ratio of lithium to the coprecipitated precursor was adjusted to Li/(Ni+Co+Mn)=1.20, and the lithium carbonate powder was fully mixed with the coprecipitated precursor to give a mixture. The mixture was subjected to calcination under the oxidizing atmosphere at 910° C. for 5 hours in the electric furnace to give a positive electrode active material.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Comparative Example I-7

Powder of a coprecipitated precursor was synthesized in the same manner as in Comparative Example I-3 except for the following procedures. That is, drops of the sodium carbonate aqueous solution were put to the reaction vessel so that a reacting solution in the reaction vessel had pH of 9.50 (±0.01).

It was found that the coprecipitated precursor was a carbonate precursor compound represented by the formula: $(Ni_{0.20}Co_{0.13}Mn_{0.67})CO_3$. Lithium carbonate powder was weighed so that a molar ratio of lithium to the coprecipitated precursor was adjusted to Li/(Ni+Co+Mn)=1.40, and the lithium carbonate powder was fully mixed with the coprecipitated precursor to give a mixture. The mixture was subjected to calcination under the oxidizing atmosphere at 880° C. for 5 hours in the electric furnace to give a positive electrode active material.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Comparative Example I-8

Powder of a coprecipitated precursor was synthesized in the same manner as in Comparative Example I-4 except for the following procedures. That is, drops of the sodium carbonate aqueous solution were put to the reaction vessel so that a reacting solution in the reaction vessel had pH of 8.50 (±0.01).

It was found that the coprecipitated precursor was a carbonate precursor compound represented by the formula: $(Ni_{0.25}Co_{0.10}Mn_{0.65})CO_3$. Lithium carbonate powder was weighed so that a molar ratio of lithium to the coprecipitated precursor was adjusted to Li/(Ni+Co+Mn)=1.35, and the lithium carbonate powder was fully mixed with the coprecipitated precursor to give a mixture. The mixture was subjected to calcination under the oxidizing atmosphere at 830° C. for 5 hours in the electric furnace to give a positive electrode active material.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Comparative Example I-9

Powder of a coprecipitated precursor was synthesized in the same manner as in Example I-1. It was found that the coprecipitated precursor was a carbonate precursor compound represented by the formula: $(Ni_{0.35}Mn_{0.65})CO_3$. Lithium carbonate powder was weighed so that a molar ratio of lithium to the coprecipitated precursor was adjusted to Li/(Ni+Mn)=1.30, and the lithium carbonate powder was fully mixed with the coprecipitated precursor to give a mixture. The mixture was subjected to calcination under the oxidizing atmosphere at 830° C. for 5 hours in the electric furnace to give a positive electrode active material.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Comparative Example I-10

Powder of a coprecipitated precursor was synthesized in the same manner as in Example I-2. It was found that the coprecipitated precursor was a carbonate precursor compound represented by the formula: $(Ni_{0.35}Co_{0.05}Mn_{0.60})CO_3$. Lithium carbonate powder was weighed so that a molar ratio of lithium to the coprecipitated precursor was adjusted to Li/(Ni+Co+Mn)=1.25, and the lithium carbonate powder was fully mixed with the coprecipitated precursor to give a mixture. The mixture was subjected to calcination under the oxidizing atmosphere at 1100° C. for 5 hours in the electric furnace to give a positive electrode active material.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Comparative Example I-11

Powder of a coprecipitated precursor was synthesized in the same manner as in Example I-3 except for the following procedures. That is, drops of the sodium carbonate aqueous solution were put to the reaction vessel so that a reacting solution in the reaction vessel had pH of 6.50 (±0.01).

It was found that the coprecipitated precursor was a carbonate precursor compound represented by the formula: $(Ni_{0.310}Co_{0.055}Mn_{0.635})CO_3$. Lithium carbonate powder was weighed so that a molar ratio of lithium to the coprecipitated precursor was adjusted to Li/(Ni+Co+Mn)=1.375, and the lithium carbonate powder was fully mixed with the coprecipitated precursor to give a mixture. The mixture was subjected to calcination under the oxidizing atmosphere at 880° C. for 5 hours in the electric furnace to give a positive electrode active material.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

Comparative Example I-12

Powder of a coprecipitated precursor was synthesized in the same manner as in Example I-1 except for the following procedures. That is, drops of the sodium carbonate aqueous solution were put to the reaction vessel so that a reacting solution in the reaction vessel had pH of 13.50 (±0.01). It was found that the coprecipitated precursor was a carbonate precursor compound represented by the formula: $(Ni_{0.35}Mn_{0.65})CO_3$. Lithium carbonate powder was weighed so that a molar ratio of lithium to the coprecipitated precursor was adjusted to Li/(Ni+Mn)=1.30, and the lithium carbonate powder was fully mixed with the coprecipitated precursor to give a mixture. The mixture was subjected to calcination under the oxidizing atmosphere at 900° C. for 5 hours in the electric furnace to give particle powder of a lithium-composite oxide.

Then a positive electrode active material was produced by using the particle powder of the lithium-composite oxide and the aluminum sulfate aqueous solution in the same manner as in Example I-4. The surface treated amount of the positive electrode active material with the aluminum sulfate was 0.31 wt %.

A coin cell was assembled in the same manner as in Example I-1 by using the obtained positive electrode active material. Was plotted a graph of which horizontal axis is the voltage V and vertical axis is the value dQ/dV. From the graph, the values |Ia|, |Ib| and |Ic| were determined and the peak intensity ratio r was calculated by using these values. The energy density and the energy density retention were determined in the same manner as in Example I-1. The results are shown in Table I-2 described later.

In the following Table I-1 are shown the composition of each positive electrode active material (a, x, y, z and the average valence of Ni in the above-mentioned compositional formula (I) when x, y and z are assumed as x+y+z=1, and when assumption is made that the average valence of Li is +1, the average valence of Co is +3, the average valence of Mn is +4 and the average valence of O is −2), Li/(Ni+Co+Mn) (Co is optionally contained), pH during synthesizing the carbonate precursor compound, the calcination temperature, and the surface treated amount of the positive electrode active material with the aluminum compound. Also in the following Table I-2 are shown |Ia|, |Ib|, |Ic|, r, the energy density, and the energy density retention.

TABLE I-1

| | Composition | | | | Average valence of Ni (valence) | Li/(Ni + Co + Mn) (Co is optional) | pH | Calcination temperature (° C.) | Surface treated amount (wt %) |
|---|---|---|---|---|---|---|---|---|---|
| | α | x | y | z | | | | | |
| Ex. No. | | | | | | | | | |
| I-1 | 0.30 | 0.50 | 0.00 | 0.50 | +2.00 | 1.30 | 8.00 | 900 | 0.00 |
| I-2 | 0.25 | 0.46 | 0.07 | 0.47 | +2.00 | 1.25 | 8.00 | 850 | 0.00 |
| I-3 | 0.38 | 0.49 | 0.09 | 0.42 | +2.16 | 1.375 | 8.00 | 880 | 0.00 |
| I-4 | 0.30 | 0.50 | 0.00 | 0.50 | +2.00 | 1.30 | 8.00 | 900 | 0.31 |
| I-5 | 0.30 | 0.50 | 0.00 | 0.50 | +2.00 | 1.30 | 8.50 | 900 | 0.00 |
| I-6 | 0.25 | 0.46 | 0.07 | 0.47 | +2.00 | 1.25 | 7.50 | 850 | 0.00 |
| I-7 | 0.38 | 0.49 | 0.09 | 0.42 | +2.16 | 1.375 | 9.00 | 880 | 0.00 |
| I-8 | 0.30 | 0.50 | 0.00 | 0.50 | +2.00 | 1.30 | 9.50 | 900 | 0.31 |
| Com. Ex. No. | | | | | | | | | |
| I-1 | 0.20 | 0.43 | 0.13 | 0.44 | +2.00 | 1.20 | 8.00 | 880 | 0.00 |
| I-2 | 0.15 | 0.47 | 0.06 | 0.47 | +2.00 | 1.20 | 8.00 | 910 | 0.00 |
| I-3 | 0.40 | 0.33 | 0.22 | 0.45 | +1.65 | 1.40 | 8.00 | 880 | 0.00 |
| I-4 | 0.35 | 0.39 | 0.15 | 0.46 | +1.80 | 1.35 | 8.00 | 830 | 0.00 |
| I-5 | 0.20 | 0.43 | 0.13 | 0.44 | +2.00 | 1.20 | 7.50 | 880 | 0.00 |
| I-6 | 0.15 | 0.47 | 0.06 | 0.47 | +2.00 | 1.20 | 9.00 | 910 | 0.00 |
| I-7 | 0.40 | 0.33 | 0.22 | 0.45 | +1.65 | 1.40 | 9.50 | 880 | 0.00 |
| I-8 | 0.35 | 0.39 | 0.15 | 0.46 | +1.80 | 1.35 | 8.50 | 830 | 0.00 |
| I-9 | 0.30 | 0.50 | 0.00 | 0.50 | +2.00 | 1.30 | 8.00 | 830 | 0.00 |
| I-10 | 0.25 | 0.46 | 0.07 | 0.47 | +2.00 | 1.25 | 8.00 | 1100 | 0.00 |
| I-11 | 0.38 | 0.49 | 0.09 | 0.42 | +2.16 | 1.375 | 6.50 | 880 | 0.00 |
| I-12 | 0.30 | 0.50 | 0.00 | 0.50 | +2.00 | 1.30 | 13.50 | 900 | 0.31 |

TABLE I-2

| | Electrochemical property | | | | | |
|---|---|---|---|---|---|---|
| | \|Ia\| (mAhg$^{-1}$V$^{-1}$) | \|Ib\| (mAhg$^{-1}$V$^{-1}$) | \|Ic\| (mAhg$^{-1}$V$^{-1}$) | r | Energy density (Wh/kg) | Energy density retention (%) |
| Ex. No. | | | | | | |
| I-1 | 171 | 257 | 64 | 0.13 | 944 | 96.3 |
| I-2 | 142 | 280 | 46 | 0.10 | 931 | 95.5 |
| I-3 | 143 | 259 | 63 | 0.14 | 973 | 95.6 |
| I-4 | 131 | 226 | 66 | 0.16 | 918 | 97.2 |
| I-5 | 175 | 257 | 66 | 0.13 | 960 | 95.5 |
| I-6 | 147 | 281 | 41 | 0.09 | 918 | 95.9 |
| I-7 | 146 | 259 | 66 | 0.14 | 978 | 95.4 |
| I-8 | 135 | 225 | 73 | 0.17 | 921 | 96.5 |
| Com. Ex. No. | | | | | | |
| I-1 | 150 | 301 | 0 | 0.00 | 865 | 91.7 |
| I-2 | 182 | 315 | 0 | 0.00 | 875 | 89.3 |
| I-3 | 106 | 180 | 152 | 0.35 | 1035 | 79.7 |
| I-4 | 114 | 220 | 130 | 0.28 | 1039 | 83.1 |
| I-5 | 148 | 300 | 0 | 0.00 | 860 | 91.7 |
| I-6 | 190 | 319 | 0 | 0.00 | 876 | 80.4 |
| I-7 | 110 | 184 | 185 | 0.39 | 1045 | 75.6 |
| I-8 | 115 | 230 | 142 | 0.29 | 1044 | 83.0 |
| I-9 | 167 | 251 | 144 | 0.26 | 952 | 89.1 |
| I-10 | 139 | 276 | 0 | 0.00 | 861 | 89.9 |
| I-11 | 129 | 225 | 0 | 0.00 | 835 | 92.3 |
| I-12 | 114 | 217 | 0 | 0.00 | 841 | 96.4 |

All of the coin cells assembled by using the positive electrode active materials in Examples I-1 to I-4 have the energy density of 880-1100 Wh/kg and the energy density retention of 93% or more. All of the coin cells assembled by using the positive electrode active materials in Examples I-5 to I-8 in which each pH condition has been changed from that in Examples I-1 to I-4 also have the energy density of 880-1100 Wh/kg and the energy density retention of 93% or more. From these results, it has been found that the positive electrode active material I according to the present invention can provide a non-aqueous electrolyte secondary battery with a high energy density retention in spite of a high energy density because the peak intensity ratio r is within the range specified in the present invention, i.e., 0<r≤0.25. Also the positive electrode active material I is a favorable and excellent positive electrode material from the viewpoint of cost because the material I contains Co which is a high-cost rare metal in a low content.

On the other hand, each Li/(Ni+Co+Mn) is too small in Comparative Examples I-1, I-2, I-5 and I-6. All of the coin cells assembled by using the positive electrode active materials produced in these comparative examples do not make the peak 3 in the graph and the peak intensity ratio r is zero. Such positive electrode active materials have a low energy density, i.e., less than 880 Wh/kg, and the energy density retention derived from each material is not high. Each Li/(Ni+Co+Mn) is too large in Comparative Examples I-3 and I-7, and each calcination temperature is too low in Comparative Examples I-4 and I-8. All of the coin cells assembled by using the positive electrode active materials produced in these comparative examples have too large |Ic| which is the value dQ/dV for the peak top of the peak 3 and the peak intensity ratio r is more than 0.25. Such positive electrode active materials have a significantly low energy density retention although the energy density is high.

The calcination temperature is too low in Comparative Example I-9, and the positive electrode active material produced in this comparative example has too large |Ic| which is the value dQ/dV for the peak top of the peak 3 and the peak intensity ratio r is more than 0.25. The coin cell assembled by using such positive electrode active material has a significantly low energy density retention although the energy density is high. The calcination temperature is too high in Comparative Example I-10, and the positive electrode active material produced in this comparative example does not make the peak 3 in the graph and the peak intensity ratio r is zero, to the contrary. The coin cell assembled by using such positive electrode active material has a low energy density, i.e., less than 880 Wh/kg, and the energy density retention derived from the material is not high.

The pH during synthesizing the carbonate precursor compound is too low in Comparative Example I-11, and the positive electrode active material produced in this comparative example does not make the peak 3 in the graph and the peak intensity ratio r is zero. The coin cell assembled by using such positive electrode active material has a low energy density, i.e., less than 880 Wh/kg. The pH during synthesizing the carbonate precursor compound is too high in Comparative Example I-12, and the positive electrode active material produced in this comparative example does not make the peak 3 in the graph and the peak intensity ratio r is zero. Also the coin cell assembled by using such positive electrode active material has a low energy density, i.e., less than 880 Wh/kg.

Thus even if it is tried to produce a material which can provide a battery with a high battery capacity or a material which can make the peak intensity ratio r high and can provide a battery with less voltage drop, cannot be produced a material which can achieve a balance between a high energy density and a high energy density retention.

As shown in FIG. 2, the coin cell assembled by using the positive electrode active material in Example I-1 shows less discharge voltage drop even if the charge/discharge is repeated. On the other hand, the coin cell assembled by using the positive electrode active material in Comparative Example I-3 shows great discharge voltage drop with repeating the charge/discharge.

The followings are important view points in the present invention. That is, there has be found a parameter for achieving a balance between a high energy density and a high energy density retention, and the specified range of the parameter for satisfying conditions. Also a material having the parameter has been actually synthesized.

From the results mentioned above, it has been found that the positive electrode active material I according to the present invention can provide a battery with less voltage drop during repeated charge/discharge, a high energy density, and also a high energy density retention, so the material I is effective as a positive electrode active material for a non-aqueous electrolyte secondary battery.

Examples According to Present Invention II and Comparative Examples

Example II-1

Were prepared 0.1 mol/L of a nickel sulfate aqueous solution and 0.1 mol/L of a manganese sulfate aqueous solution. The nickel sulfate aqueous solution and the manganese sulfate aqueous solution were mixed with each other so that a molar ratio of nickel and manganese was adjusted to Ni:Mn=0.35:0.65 to give a mixture solution. Was prepared 1 mol/L of a sodium carbonate aqueous solution. To a sealed type reaction vessel was supplied 8 L of water, and a temperature inside the reaction vessel was kept at 40° C. under nitrogen gas circulation. Drops of the mixture solution and the sodium carbonate aqueous solution were continuously put to the reaction vessel with stirring at a speed of 5 mL/min. Simultaneously drops of the sodium carbonate aqueous solution were put to the reaction vessel so that a reacting solution in the reaction vessel had pH of 7.80 (±0.01). During reaction of the reacting solution, only a filtrate was removed from a reaction system by using a concentration vessel and a solid content was stirred at 500 rpm for 20 hours with retaining in the reaction vessel. After reaction, a slurry of a coprecipitated product was collected. The collected slurry was filtrated and washed with water. After washing with water, the slurry was dried overnight at 120° C. to give powder of a coprecipitated precursor.

The coprecipitated precursor was subjected to ICP emission spectrometry. As a result, it was found that the coprecipitated precursor was a carbonate precursor compound represented by the formula: $(Ni_{0.35}Mn_{0.65})CO_3$. Lithium carbonate powder was weighed so that a molar ratio of lithium to the coprecipitated precursor was adjusted to Li/(Ni+Mn)=1.30, and the lithium carbonate powder was fully mixed with the coprecipitated precursor to give a mixture. The mixture was subjected to calcination under an oxidizing atmosphere at 900° C. for 5 hours in an electric furnace to give a positive electrode active material.

Figure 3:
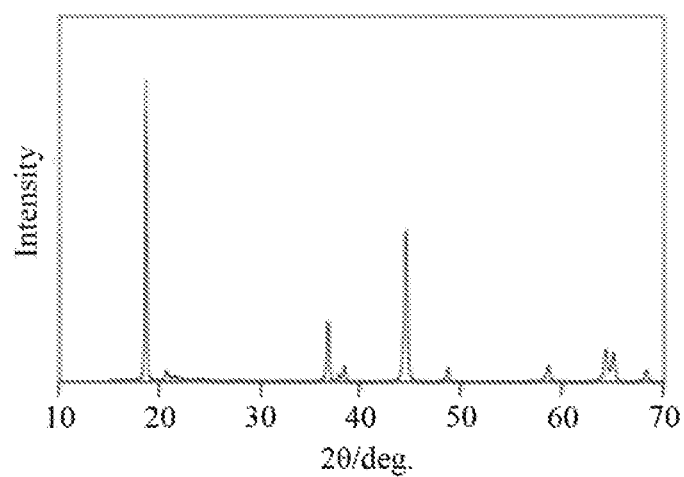
FIG. 3 shows a powder X-ray diffraction pattern of a positive electrode active material of Example II-1.

The powder X-ray diffraction for powder of the positive electrode active material was carried out in accordance with the above-mentioned method. From the obtained data, the relative height intensity ratio and the crystallite size were calculated. The powder X-ray diffraction pattern is shown in FIG. 3. The BET specific surface area, the cycle property, the rate property, and the energy density were obtained in accordance with the above-mentioned methods, respectively. The results are shown in Tables II-2 and II-3 described later. The presence or absence of the spinel hetero phase is also shown in Table II-2.

Example II-2

Powder of a coprecipitated precursor was synthesized in the same manner as in Example II-1 except for the following procedures. That is, the nickel sulfate aqueous solution, a cobalt sulfate aqueous solution and the manganese sulfate aqueous solution were mixed with each other so that a molar ratio of nickel, cobalt and manganese was adjusted to Ni:Co:Mn=0.35:0.01:0.64 to give a mixture solution.

It was found that the coprecipitated precursor was a carbonate precursor compound represented by the formula: $(Ni_{0.35}Co_{0.01}Mn_{0.64})CO_3$. Lithium carbonate powder was weighed so that a molar ratio of lithium to the coprecipitated precursor was adjusted to Li/(Ni+Co+Mn)=1.30, and the lithium carbonate powder was fully mixed with the coprecipitated precursor to give a mixture. The mixture was subjected to calcination under the oxidizing atmosphere at 930° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Example II-3

Powder of a coprecipitated precursor was synthesized in the same manner as in Example II-1 except for the following procedures. That is, the nickel sulfate aqueous solution, the cobalt sulfate aqueous solution and the manganese sulfate aqueous solution were mixed with each other so that a molar ratio of nickel, cobalt and manganese was adjusted to Ni:Co:Mn=0.33:0.03:0.64 to give a mixture solution.

It was found that the coprecipitated precursor was a carbonate precursor compound represented by the formula: $(Ni_{0.33}Co_{0.03}Mn_{0.64})CO_3$. Lithium carbonate powder was weighed so that a molar ratio of lithium to the coprecipitated precursor was adjusted to Li/(Ni+Co+Mn)=1.30, and the lithium carbonate powder was fully mixed with the coprecipitated precursor to give a mixture. The mixture was subjected to calcination under the oxidizing atmosphere at 880° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Example II-4

Powder of a coprecipitated precursor was synthesized in the same manner as in Example II-1 except for the following procedures. That is, the nickel sulfate aqueous solution, the cobalt sulfate aqueous solution and the manganese sulfate aqueous solution were mixed with each other so that a molar ratio of nickel, cobalt and manganese was adjusted to Ni:Co:Mn=0.30:0.06:0.64 to give a mixture solution.

It was found that the coprecipitated precursor was a carbonate precursor compound represented by the formula: $(Ni_{0.30}Co_{0.06}Mn_{0.64})CO_3$. Lithium carbonate powder was weighed so that a molar ratio of lithium to the coprecipitated precursor was adjusted to Li/(Ni+Co+Mn)=1.40, and the lithium carbonate powder was fully mixed with the coprecipitated precursor to give a mixture. The mixture was subjected to calcination under the oxidizing atmosphere at 930° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Example II-5

Powder of a coprecipitated precursor was synthesized in the same manner as in Example II-4. It was found that the coprecipitated precursor was a carbonate precursor compound represented by the formula: $(Ni_{0.30}Co_{0.06}Mn_{0.64})CO_3$. Lithium carbonate powder was weighed so that a molar ratio of lithium to the coprecipitated precursor was adjusted to Li/(Ni+Co+Mn)=1.40, and the lithium carbonate powder was fully mixed with the coprecipitated precursor to give a mixture. The mixture was subjected to calcination under the oxidizing atmosphere at 930° C. for 5 hours in the electric furnace to give particle powder of a lithium-composite oxide.

Then 100 g of the particle powder of the lithium-composite oxide was supplied to 50 mL of pure water with stirring, of which temperature was kept at 30° C., to give a slurry of an intermediate calcined material. To the slurry of the intermediate calcined material were put drops of 6 mL of an aluminum sulfate aqueous solution having an aluminum sulfate concentration of 1.0 mol/L. A reaction system of the slurry and the aluminum sulfate aqueous solution was filtrated and washed with water, and then dried at 120° C. The reaction system was subjected to calcination under air circulation at 400° C. for 5 hours in the electric furnace to give a positive electrode active material. A surface treated amount of the positive electrode active material with the aluminum sulfate was 0.34 wt %.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Example II-6

Powder of a coprecipitated precursor was synthesized in the same manner as in Example II-1 except for the following procedures. That is, drops of the sodium carbonate aqueous solution were put to the reaction vessel so that a reacting solution in the reaction vessel had pH of 9.50 (±0.01).

It was found that the coprecipitated precursor was a carbonate precursor compound represented by the formula: $(Ni_{0.35}Mn_{0.65})CO_3$. Lithium carbonate powder was weighed so that a molar ratio of lithium to the coprecipitated precursor was adjusted to Li/(Ni+Mn)=1.30, and the lithium carbonate powder was fully mixed with the coprecipitated precursor to give a mixture. The mixture was subjected to calcination under the oxidizing atmosphere at 900° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Example II-7

Powder of a coprecipitated precursor was synthesized in the same manner as in Example II-2 except for the following procedures. That is, drops of the sodium carbonate aqueous solution were put to the reaction vessel so that a reacting solution in the reaction vessel had pH of 9.00 (±0.01).

It was found that the coprecipitated precursor was a carbonate precursor compound represented by the formula: $(Ni_{0.35}Co_{0.01}Mn_{0.64})CO_3$. Lithium carbonate powder was weighed so that a molar ratio of lithium to the coprecipitated precursor was adjusted to Li/(Ni+Co+Mn)=1.30, and the lithium carbonate powder was fully mixed with the coprecipitated precursor to give a mixture. The mixture was subjected to calcination under the oxidizing atmosphere at 930° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Example II-8

Powder of a coprecipitated precursor was synthesized in the same manner as in Example II-3 except for the following procedures. That is, drops of the sodium carbonate aqueous solution were put to the reaction vessel so that a reacting solution in the reaction vessel had pH of 8.50 (±0.01).

It was found that the coprecipitated precursor was a carbonate precursor compound represented by the formula: $(Ni_{0.33}Co_{0.03}Mn_{0.64})CO_3$. Lithium carbonate powder was weighed so that a molar ratio of lithium to the coprecipitated precursor was adjusted to Li/(Ni+Co+Mn)=1.30, and the lithium carbonate powder was fully mixed with the coprecipitated precursor to give a mixture. The mixture was subjected to calcination under the oxidizing atmosphere at 880° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Example II-9

Powder of a coprecipitated precursor was synthesized in the same manner as in Example II-4 except for the following procedures. That is, drops of the sodium carbonate aqueous solution were put to the reaction vessel so that a reacting solution in the reaction vessel had pH of 7.50 (±0.01).

It was found that the coprecipitated precursor was a carbonate precursor compound represented by the formula: $(Ni_{0.30}Co_{0.06}Mn_{0.64})CO_3$. Lithium carbonate powder was weighed so that a molar ratio of lithium to the coprecipitated precursor was adjusted to Li/(Ni+Co+Mn)=1.40, and the lithium carbonate powder was fully mixed with the coprecipitated precursor to give a mixture. The mixture was subjected to calcination under the oxidizing atmosphere at 930° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Example II-10

Powder of a coprecipitated precursor was synthesized in the same manner as in Example II-9. It was found that the coprecipitated precursor was a carbonate precursor compound represented by the formula: $(Ni_{0.30}Co_{0.06}Mn_{0.64})CO_3$. Lithium carbonate powder was weighed so that a molar ratio of lithium to the coprecipitated precursor was adjusted to Li/(Ni+Co+Mn)=1.40, and the lithium carbonate powder was fully mixed with the coprecipitated precursor to give a mixture. The mixture was subjected to calcination under the oxidizing atmosphere at 930° C. for 5 hours in the electric furnace to give particle powder of a lithium-composite oxide.

Then 100 g of the particle powder of the lithium-composite oxide was supplied to 50 mL of pure water with stirring, of which temperature was kept at 30° C., to give a slurry of an intermediate calcined material. To the slurry of the intermediate calcined material were put drops of 6 mL of an aluminum sulfate aqueous solution having an aluminum sulfate concentration of 1.0 mol/L. A reaction system of the slurry and the aluminum sulfate aqueous solution was filtrated and washed with water, and then dried at 120° C. The reaction system was subjected to calcination under air circulation at 400° C. for 5 hours in the electric furnace to give a positive electrode active material. A surface treated amount of the positive electrode active material with the aluminum sulfate was 0.34 wt %.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Comparative Example II-1

Powder of a coprecipitated precursor was synthesized in the same manner as in Example II-1 except for the following procedures. That is, the nickel sulfate aqueous solution, the cobalt sulfate aqueous solution and the manganese sulfate aqueous solution were mixed with each other so that a molar ratio of nickel, cobalt and manganese was adjusted to Ni:Co:Mn=0.25:0.10:0.65 to give a mixture solution.

It was found that the coprecipitated precursor was a carbonate precursor compound represented by the formula: $(Ni_{0.25}Co_{0.10}Mn_{0.65})CO_3$. Lithium carbonate powder was weighed so that a molar ratio of lithium to the coprecipitated precursor was adjusted to Li/(Ni+Co+Mn)=1.35, and the lithium carbonate powder was fully mixed with the coprecipitated precursor to give a mixture. The mixture was subjected to calcination under the oxidizing atmosphere at 880° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Comparative Example II-2

Powder of a coprecipitated precursor was synthesized in the same manner as in Example II-1 except for the following procedures. That is, the nickel sulfate aqueous solution, the cobalt sulfate aqueous solution and the manganese sulfate aqueous solution were mixed with each other so that a molar ratio of nickel, cobalt and manganese was adjusted to Ni:Co:Mn=0.23:0.10:0.67 to give a mixture solution.

It was found that the coprecipitated precursor was a carbonate precursor compound represented by the formula: $(Ni_{0.23}Co_{0.10}Mn_{0.67})CO_3$. Lithium carbonate powder was weighed so that a molar ratio of lithium to the coprecipitated precursor was adjusted to Li/(Ni+Co+Mn)=1.35, and the lithium carbonate powder was fully mixed with the coprecipitated precursor to give a mixture. The mixture was subjected to calcination under the oxidizing atmosphere at 910° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Comparative Example II-3

Powder of a coprecipitated precursor was synthesized in the same manner as in Example II-1 except for the following procedures. That is, the nickel sulfate aqueous solution, the cobalt sulfate aqueous solution and the manganese sulfate aqueous solution were mixed with each other so that a molar ratio of nickel, cobalt and manganese was adjusted to Ni:Co:Mn=0.30:0.20:0.50 to give a mixture solution.

It was found that the coprecipitated precursor was a carbonate precursor compound represented by the formula: $(Ni_{0.30}Co_{0.20}Mn_{0.50})CO_3$. Lithium carbonate powder was weighed so that a molar ratio of lithium to the coprecipitated precursor was adjusted to Li/(Ni+Co+Mn)=1.25, and the lithium carbonate powder was fully mixed with the coprecipitated precursor to give a mixture. The mixture was subjected to calcination under the oxidizing atmosphere at 880° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Comparative Example II-4

Powder of a coprecipitated precursor was synthesized in the same manner as in Example II-1 except for the following procedures. That is, the nickel sulfate aqueous solution, the cobalt sulfate aqueous solution and the manganese sulfate aqueous solution were mixed with each other so that a molar ratio of nickel, cobalt and manganese was adjusted to Ni:Co:Mn=0.30:0.20:0.50 to give a mixture solution.

It was found that the coprecipitated precursor was a carbonate precursor compound represented by the formula: $(Ni_{0.30}Co_{0.20}Mn_{0.50})CO_3$. Lithium carbonate powder was weighed so that a molar ratio of lithium to the coprecipitated precursor was adjusted to Li/(Ni+Co+Mn)=1.20, and the lithium carbonate powder was fully mixed with the coprecipitated precursor to give a mixture. The mixture was subjected to calcination under the oxidizing atmosphere at 910° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Comparative Example II-5

Powder of a coprecipitated precursor was synthesized in the same manner as in Comparative Example II-1 except for the following procedures. That is, drops of the sodium carbonate aqueous solution were put to the reaction vessel so that a reacting solution in the reaction vessel had pH of 9.50 (±0.01).

It was found that the coprecipitated precursor was a carbonate precursor compound represented by the formula: $(Ni_{0.25}Co_{0.10}Mn_{0.65})CO_3$. Lithium carbonate powder was weighed so that a molar ratio of lithium to the coprecipitated precursor was adjusted to Li/(Ni+Co+Mn)=1.35, and the lithium carbonate powder was fully mixed with the coprecipitated precursor to give a mixture. The mixture was subjected to calcination under the oxidizing atmosphere at 880° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Comparative Example II-6

Powder of a coprecipitated precursor was synthesized in the same manner as in Comparative Example II-2 except for the following procedures. That is, drops of the sodium carbonate aqueous solution were put to the reaction vessel so that a reacting solution in the reaction vessel had pH of 9.00 (±0.01).

It was found that the coprecipitated precursor was a carbonate precursor compound represented by the formula: $(Ni_{0.23}Co_{0.10}Mn_{0.67})CO_3$. Lithium carbonate powder was weighed so that a molar ratio of lithium to the coprecipitated precursor was adjusted to Li/(Ni+Co+Mn)=1.35, and the lithium carbonate powder was fully mixed with the coprecipitated precursor to give a mixture. The mixture was subjected to calcination under the oxidizing atmosphere at 910° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Comparative Example II-7

Powder of a coprecipitated precursor was synthesized in the same manner as in Comparative Example II-3 except for the following procedures. That is, drops of the sodium carbonate aqueous solution were put to the reaction vessel so that a reacting solution in the reaction vessel had pH of 8.50 (±0.01).

It was found that the coprecipitated precursor was a carbonate precursor compound represented by the formula: $(Ni_{0.30}Co_{0.20}Mn_{0.50})CO_3$. Lithium carbonate powder was weighed so that a molar ratio of lithium to the coprecipitated precursor was adjusted to Li/(Ni+Co+Mn)=1.25, and the lithium carbonate powder was fully mixed with the coprecipitated precursor to give a mixture. The mixture was subjected to calcination under the oxidizing atmosphere at 880° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Comparative Example II-8

Powder of a coprecipitated precursor was synthesized in the same manner as in Comparative Example II-4 except for the following procedures. That is, drops of the sodium carbonate aqueous solution were put to the reaction vessel so that a reacting solution in the reaction vessel had pH of 7.50 (±0.01).

It was found that the coprecipitated precursor was a carbonate precursor compound represented by the formula: $(Ni_{0.30}Co_{0.20}Mn_{0.50})CO_3$. Lithium carbonate powder was weighed so that a molar ratio of lithium to the coprecipitated precursor was adjusted to Li/(Ni+Co+Mn)=1.20, and the lithium carbonate powder was fully mixed with the coprecipitated precursor to give a mixture. The mixture was subjected to calcination under the oxidizing atmosphere at 910° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Comparative Example II-9

Powder of a coprecipitated precursor was synthesized in the same manner as in Example II-1. It was found that the coprecipitated precursor was a carbonate precursor compound represented by the formula: $(Ni_{0.35}Mn_{0.65})CO_3$. Lithium carbonate powder was weighed so that a molar ratio of lithium to the coprecipitated precursor was adjusted to Li/(Ni+Mn)=1.30, and the lithium carbonate powder was fully mixed with the coprecipitated precursor to give a mixture. The mixture was subjected to calcination under the oxidizing atmosphere at 830° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Comparative Example II-10

Powder of a coprecipitated precursor was synthesized in the same manner as in Example II-2. It was found that the coprecipitated precursor was a carbonate precursor compound represented by the formula: $(Ni_{0.35}Co_{0.01}Mn_{0.64})CO_3$. Lithium carbonate powder was weighed so that a molar ratio of lithium to the coprecipitated precursor was adjusted to Li/(Ni+Co+Mn)=1.30, and the lithium carbonate powder was fully mixed with the coprecipitated precursor to give a mixture. The mixture was subjected to calcination under the oxidizing atmosphere at 1100° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Comparative Example II-11

Powder of a coprecipitated precursor was synthesized in the same manner as in Example II-3 except for the following procedures. That is, drops of the sodium carbonate aqueous solution were put to the reaction vessel so that a reacting solution in the reaction vessel had pH of 6.50 (±0.01).

It was found that the coprecipitated precursor was a carbonate precursor compound represented by the formula: $(Ni_{0.33}Co_{0.03}Mn_{0.64})CO_3$. Lithium carbonate powder was weighed so that a molar ratio of lithium to the coprecipitated precursor was adjusted to Li/(Ni+Co+Mn)=1.30, and the lithium carbonate powder was fully mixed with the coprecipitated precursor to give a mixture. The mixture was subjected to calcination under the oxidizing atmosphere at 880° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

Comparative Example II-12

Powder of a coprecipitated precursor was synthesized in the same manner as in Example II-4 except for the following procedures. That is, drops of the sodium carbonate aqueous solution were put to the reaction vessel so that a reacting solution in the reaction vessel had pH of 13.50 (±0.01).

It was found that the coprecipitated precursor was a carbonate precursor compound represented by the formula: $(Ni_{0.30}Co_{0.06}Mn_{0.64})CO_3$. Lithium carbonate powder was weighed so that a molar ratio of lithium to the coprecipitated precursor was adjusted to Li/(Ni+Co+Mn)=1.40, and the lithium carbonate powder was fully mixed with the coprecipitated precursor to give a mixture. The mixture was subjected to calcination under the oxidizing atmosphere at 930° C. for 5 hours in the electric furnace to give a positive electrode active material.

As to the obtained powder of the positive electrode active material, the relative height intensity ratio, the crystallite size, the BET specific surface area, the cycle property, the rate property, and the energy density were obtained in the same manner as in Example II-1. The results are shown in Tables II-2 and II-3 described later. The presence or absence of the spinel hetero phase is also shown in Table II-2.

In the following Table II-1 are shown the composition of each positive electrode active material (β, a, b and c in the above-mentioned compositional formula (II)), pH during synthesizing the carbonate precursor compound, the calcination temperature, and the surface treated amount of the positive electrode active material with the aluminum compound. In the following Table II-2 are shown the presence or absence of the spinel hetero phase, the relative height intensity ratio, the crystallite size, and the BET specific surface area. Also in the following Table II-3 are shown the cycle property, the rate property, and the energy density.

TABLE II-1

| Ex. No. | Composition | | | | pH | Calcination temperature (° C.) | Surface treated amount (wt %) |
|---|---|---|---|---|---|---|---|
| | β | a | b | c | | | |
| II-1 | 0.13 | 0.35 | 0.00 | 0.65 | 7.80 | 900 | 0.00 |
| II-2 | 0.13 | 0.35 | 0.01 | 0.64 | 7.80 | 930 | 0.00 |
| II-3 | 0.13 | 0.33 | 0.03 | 0.64 | 7.80 | 880 | 0.00 |
| II-4 | 0.17 | 0.30 | 0.06 | 0.64 | 7.80 | 930 | 0.00 |
| II-5 | 0.17 | 0.30 | 0.06 | 0.64 | 7.80 | 930 | 0.34 |
| II-6 | 0.13 | 0.35 | 0.00 | 0.65 | 9.50 | 900 | 0.00 |
| II-7 | 0.13 | 0.35 | 0.01 | 0.64 | 9.00 | 930 | 0.00 |
| II-8 | 0.13 | 0.33 | 0.03 | 0.64 | 8.50 | 880 | 0.00 |
| II-9 | 0.17 | 0.30 | 0.06 | 0.64 | 7.50 | 930 | 0.00 |
| II-10 | 0.17 | 0.30 | 0.06 | 0.64 | 7.50 | 930 | 0.34 |
| Com. Ex. No. | | | | | | | |
| II-1 | 0.15 | 0.25 | 0.10 | 0.65 | 7.80 | 880 | 0.00 |
| II-2 | 0.15 | 0.23 | 0.10 | 0.67 | 7.80 | 910 | 0.00 |
| II-3 | 0.11 | 0.30 | 0.20 | 0.50 | 7.80 | 880 | 0.00 |
| II-4 | 0.09 | 0.30 | 0.20 | 0.50 | 7.80 | 910 | 0.00 |
| II-5 | 0.15 | 0.25 | 0.10 | 0.65 | 9.50 | 880 | 0.00 |
| II-6 | 0.15 | 0.23 | 0.10 | 0.67 | 9.00 | 910 | 0.00 |
| II-7 | 0.11 | 0.30 | 0.20 | 0.50 | 8.50 | 880 | 0.00 |
| II-8 | 0.09 | 0.30 | 0.20 | 0.50 | 7.50 | 910 | 0.00 |
| II-9 | 0.13 | 0.35 | 0.00 | 0.65 | 7.80 | 830 | 0.00 |
| II-10 | 0.13 | 0.35 | 0.01 | 0.64 | 7.80 | 1100 | 0.00 |
| II-11 | 0.13 | 0.33 | 0.03 | 0.64 | 6.50 | 880 | 0.00 |
| II-12 | 0.17 | 0.30 | 0.06 | 0.64 | 13.50 | 930 | 0.00 |

TABLE II-2

| | Property of powder | | | |
|---|---|---|---|---|
| | Spinel hetero phase | Relative height intensity ratio (IIa)/(IIb) | Crystallite size (nm) | BET specific surface area (m²/g) |
| Ex. II-1 | None | 0.019 | 29 | 6.1 |
| Ex. II-2 | None | 0.027 | 35 | 4.3 |
| Ex. II-3 | None | 0.021 | 28 | 5.6 |
| Ex. II-4 | None | 0.032 | 37 | 4.1 |
| Ex. II-5 | None | 0.030 | 35 | 7.6 |
| Ex. II-6 | None | 0.017 | 26 | 6.9 |
| Ex. II-7 | None | 0.027 | 31 | 4.8 |
| Ex. II-8 | None | 0.019 | 27 | 6.1 |
| Ex. II-9 | None | 0.031 | 39 | 3.8 |
| Ex. II-10 | None | 0.034 | 39 | 7.4 |
| Com. Ex. II-1 | None | 0.030 | 38 | 8.9 |
| Com. Ex. II-2 | None | 0.033 | 41 | 8.3 |
| Com. Ex. II-3 | None | 0.018 | 39 | 10.2 |
| Com. Ex. II-4 | None | 0.021 | 43 | 8.7 |
| Com. Ex. II-5 | None | 0.032 | 32 | 9.0 |
| Com. Ex. II-6 | None | 0.031 | 40 | 8.8 |
| Com. Ex. II-7 | None | 0.019 | 39 | 10.4 |
| Com. Ex. II-8 | None | 0.025 | 51 | 7.0 |
| Com. Ex. II-9 | None | 0.014 | 26 | 6.6 |
| Com. Ex. II-10 | None | 0.041 | 54 | 3.2 |
| Com. Ex. II-11 | None | 0.036 | 39 | 3.5 |
| Com. Ex. II-12 | None | 0.031 | 31 | 8.9 |

TABLE II-3

| | Electrochemical property | | |
|---|---|---|---|
| | Cycle property (%) | Rate property (%) | Energy density (Wh/kg) |
| Ex. II-1 | 94.8 | 84.6 | 954 |
| Ex. II-2 | 95.1 | 85.0 | 964 |
| Ex. II-3 | 94.5 | 82.4 | 952 |

TABLE II-3-continued

| | Electrochemical property | | |
|---|---|---|---|
| | Cycle property (%) | Rate property (%) | Energy density (Wh/kg) |
| Ex. II-4 | 95.1 | 84.1 | 958 |
| Ex. II-5 | 97.0 | 89.9 | 988 |
| Ex. II-6 | 93.3 | 84.8 | 958 |
| Ex. II-7 | 94.2 | 85.7 | 968 |
| Ex. II-8 | 93.9 | 84.5 | 969 |
| Ex. II-9 | 95.4 | 83.8 | 949 |
| Ex. II-10 | 97.1 | 89.6 | 985 |
| Com. Ex. II-1 | 92.6 | 79.1 | 985 |
| Com. Ex. II-2 | 94.4 | 76.0 | 917 |
| Com. Ex. II-3 | 93.0 | 87.7 | 848 |
| Com. Ex. II-4 | 90.9 | 87.1 | 831 |
| Com. Ex. II-5 | 91.5 | 79.8 | 988 |
| Com. Ex. II-6 | 93.8 | 78.3 | 923 |
| Com. Ex. II-7 | 91.6 | 88.4 | 864 |
| Com. Ex. II-8 | 93.4 | 83.9 | 819 |
| Com. Ex. II-9 | 91.7 | 84.8 | 966 |
| Com. Ex. II-10 | 93.0 | 75.4 | 878 |
| Com. Ex. II-11 | 94.4 | 78.2 | 906 |
| Com. Ex. II-12 | 89.7 | 84.4 | 961 |

All of the coin cells assembled by using the positive electrode active materials in Examples II-1 to II-10 have the energy density of 880-1100 Wh/kg, the cycle property of 93% or more, and the rate property of 80% or more. From this result, it has been found that the positive electrode active material II according to the present invention can provide a non-aqueous electrolyte secondary battery with excellent cycle property and excellent rate property in spite of a high energy density because the relative height intensity ratio of (IIa) to (IIb), i.e., (IIa)/(IIb), is within the range specified in the present invention, i.e., 0.015-0.035, in which (IIa) is the height intensity of a maximum diffraction peak at $2\theta=20.8\pm1°$ and (IIb) is the height intensity of a maximum diffraction peak at $2\theta=18.6\pm1°$ in the powder X-ray diffraction pattern obtained by using Cu-Kα ray; the crystallite size calculated by using Scherrer's equation from (104) diffracted X-ray in the powder X-ray diffraction pattern obtained by using Cu-Kα ray is within the range specified in the present invention, i.e., 25-40 nm; and the BET specific surface area is within the range specified in the present invention, i.e., 3.5-8.5 m²/g. Also the positive electrode active material II is a favorable and excellent positive electrode material from the viewpoint of cost because the material II contains Co which is a high-cost rare metal in a low content.

On the other hand, the BET specific surface area is more than 8.5 m²/g although the relative height intensity ratio (IIa)/(IIb) is within the range of 0.015-0.035 and the crystallite size is within the range of 25-40 nm in Comparative Examples II-1, II-5 and II-6. The coin cells assembled by using such positive electrode active materials show poor cycle property and/or poor rate property although the energy density is high.

The crystallite size is more than 40 nm although the relative height intensity ratio (IIa)/(IIb) is within the range of 0.015-0.035 and the BET specific surface area is within the range of 3.5-8.5 m²/g in Comparative Example II-2. The coin cell assembled by using such positive electrode active material shows poor rate property although the cycle property is excellent and the energy density is high.

The BET specific surface area is significantly more than 8.5 m²/g although the relative height intensity ratio (IIa)/(IIb) is within the range of 0.015-0.035 and the crystallite size is within the range of 25-40 nm in Comparative Examples II-3 and II-7. The coin cells assembled by using such positive electrode active materials have a low energy density.

The crystallite size is more than 40 nm and the BET specific surface area is more than 8.5 m²/g although the relative height intensity ratio (IIa)/(IIb) is within the range of 0.015-0.035 in Comparative Example II-4. The coin cell assembled by using such positive electrode active material shows poor cycle property and has a low energy density although the rate property is excellent.

The crystallite size is significantly more than 40 nm although the relative height intensity ratio (IIa)/(IIb) is within the range of 0.015-0.035 and the BET specific surface area is within the range of 3.5-8.5 m²/g in Comparative Example II-8. The coin cell assembled by using such positive electrode active material has a low energy density.

The relative height intensity ratio (IIa)/(IIb) is less than 0.015 although the crystallite size is within the range of 25-40 nm and the BET specific surface area is within the range of 3.5-8.5 m²/g in Comparative Example II-9. The coin cell assembled by using such positive electrode active material shows poor cycle property although the energy density is high and the rate property is excellent.

The relative height intensity ratio (IIa)/(IIb) is more than 0.035, the crystallite size is significantly more than 40 nm, and the BET specific surface area is less than 3.5 m²/g in Comparative Example II-10. The coin cell assembled by using such positive electrode active material shows poor rate property and has a low energy density.

The relative height intensity ratio (IIa)/(IIb) is more than 0.035 although the crystallite size is within the range of 25-40 nm and the BET specific surface area is within the range of 3.5-8.5 m²/g in Comparative Example II-11. The coin cell assembled by using such positive electrode active material shows poor rate property although the energy density is high and the cycle property is excellent.

The BET specific surface area is more than 8.5 m²/g although the relative height intensity ratio (IIa)/(IIb) is within the range of 0.015-0.035 and the crystallite size is within the range of 25-40 nm in Comparative Example II-12. The coin cell assembled by using such positive electrode active material shows poor cycle property although the energy density is high and the rate property is excellent.

When the calcination temperature is heightened for improving the crystallinity in order to achieve excellent cycle property, in general, the crystallite size becomes to be large and the rate property becomes to be poor. Also when the calcination temperature is lowered for minifying the crystallite size in order to achieve excellent rate property, the crystallinity cannot be fully and the cycle property becomes to be poor. Accordingly, from previous knowledge has not been produced an active material which can achieve a balance between the cycle property and the rate property.

The followings are important view points in the present invention. That is, there has be found various properties of powder, i.e., parameters, for achieving a balance between excellent cycle property and excellent rate property. Also a material having the parameters has been actually synthesized.

From the results mentioned above, it has been found that the positive electrode active material II according to the present invention can provide a battery with excellent cycle property, excellent rate property, and also a high energy density, so the material II is effective as a positive electrode active material for a non-aqueous electrolyte secondary battery.

The embodiments described above are examples of the art in the present disclosure. Accordingly, it is understood that various modifications, replacements, additions, omissions, and the like can be performed within the scope of the claims or within an equivalent scope thereof.

The positive electrode active material I according to the present invention can provide a battery with a high energy density retention as well as less voltage drop during repeated charge/discharge and a high energy density, so the material I is suitable as a positive electrode active material for a non-aqueous electrolyte secondary battery.

The positive electrode active material II according to the present invention can provide a battery with excellent cycle property, excellent rate property, and also a high energy density, so the material II is also suitable as a positive electrode active material for a non-aqueous electrolyte secondary battery.

As described above, embodiments have been described as examples of art in the present invention. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present invention, it is understood that various modifications, replacements, additions, omissions, and the like can be performed in the scope of the claims or in an equivalent scope thereof.

What is claimed is:

1. A positive electrode active material comprising a layered lithium-composite oxide containing Li, Ni and Mn, and optionally containing Co, wherein
when a non-aqueous electrolyte secondary battery in which the positive electrode active material is used for a positive electrode and a lithium foil is used for a negative electrode is subjected to charge/discharge under a condition (I-1), in a graph of which horizontal axis is a voltage "V" and vertical axis is a value dQ/dV, the value dQ/dV is a differentiation of a battery capacity "Q" divided by the voltage "V" for the voltage "V" and the battery capacity "Q" after a $5^{th}$ cycle of the condition (I-1),
a peak intensity ratio "r" represented by the equation:

$$r=|Ic|/(|Ia|+|Ic|)$$

satisfies $0<r\leq0.25$, in which
|Ia| is an absolute value of the value dQ/dV for a peak top of a peak 1 having the peak top within a range of more than 3.9 V to 4.4 V or less,
|Ib| is an absolute value of the value dQ/dV for a peak top of a peak 2 having the peak top within a range of more than 3.5 V to 3.9 V or less, and
|Ic| is an absolute value of the value dQ/dV for a peak top of a peak 3 having the peak top within a range of 2.0 V or more to 3.5 V or less,
the condition (I-1) is set as, under a circumstance at 25° C.:
$1^{st}$ cycle from 2.0V to 4.6V with charge at 0.07 C rate (constant current, constant voltage) and discharge at 0.07 C rate (constant current),
$2^{nd}$ cycle from 2.0V to 4.6V with charge at 0.07 C rate (constant current) and discharge at 0.07 C rate (cc),
$3^{rd}$ cycle from 2.0V to 4.3V with charge at 0.1 C rate (constant current) and discharge at 0.1 C rate (constant current),
$4^{th}$ cycle from 2.0V to 4.3V with charge at 0.1 C rate (constant current) and discharge at 1 C rate (constant current), and
$5^{th}$ cycle from 2.0V to 4.45V with charge at 0.1 C rate (constant current) and discharge at 1 C rate (constant current),
in which the C rate represents a relative ratio of a current during charge or discharge to a battery capacity in an hour and 1 C rate is converted for a 270 mA/g battery capacity,
wherein the positive electrode active material is represented by the compositional formula (I):

$$(1-\alpha)(LiNi_xCo_yMn_zO_2)\cdot\alpha Lb_2MnO_3 \qquad (I)$$

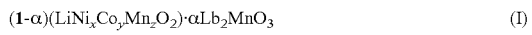

in the compositional formula (I), when x, y and z are assumed as x+y+z=1, and when assumption is made that an average valence of Li is +1, an average valence of Co is +3, an average valence of Mn is +4 and an average valence of O is -2,
a range of a is $0.21\leq\alpha\leq0.40$, a range of x is $0.45\leq x\leq0.51$, a range of y is $0\leq y\leq0.12$, and an average valence of Ni is from +1.90 to +2.25.

2. The positive electrode active material according to claim 1, wherein a discharge energy density during $1^{st}$ cycle in the condition (I-1) is 880-1100 Wh/kg.

3. A method for producing the positive electrode active material according to claim 1, comprising:
a step of synthesizing a carbonate precursor compound containing Ni and Mn, and optionally containing Co under a condition of pH=6.8-13.2;
a step of preparing a mixture by mixing a lithium compound with the carbonate precursor compound so that a molar ratio of Li to a sum of Ni, Mn and Co, Li/(Ni+Co+Mn), is 1.25 -1.39; and
a step of preparing the layered lithium-composite oxide by calcination of the mixture under an oxidizing atmosphere at 840-1000° C.

4. The method for producing the positive electrode active material, according to claim 3, wherein
a mixture solution is prepared by blending a nickel compound and a manganese compound so that a molar ratio of Ni and Mn, Ni:Mn is 0.25-0.45:0.55-0.75, or
a mixture solution is prepared by blending a nickel compound, a cobalt compound and a manganese compound so that a molar ratio of Ni, Co and Mn, Ni:Co:Mn is 0.25-0.45:0.02-0.10:0.50-0.70; and
the carbonate precursor compound is synthesized by using the mixture solution.

5. The method for producing the positive electrode active material, according to claim 3, wherein
a surface of primary particles and/or secondary particles of the layered lithium-composite oxide is covered with an aluminum compound and/or a solid solution of the aluminum compound is prepared over the surface of the primary particles and/or the secondary particles of the layered lithium-composite oxide so that an amount of the aluminum compound is 0.1-0.7 wt % relative to the positive electrode active material.

6. A non-aqueous electrolyte secondary battery comprising a positive electrode containing the positive electrode active material according to claim 1.

* * * * *